UNITED STATES PATENT OFFICE.

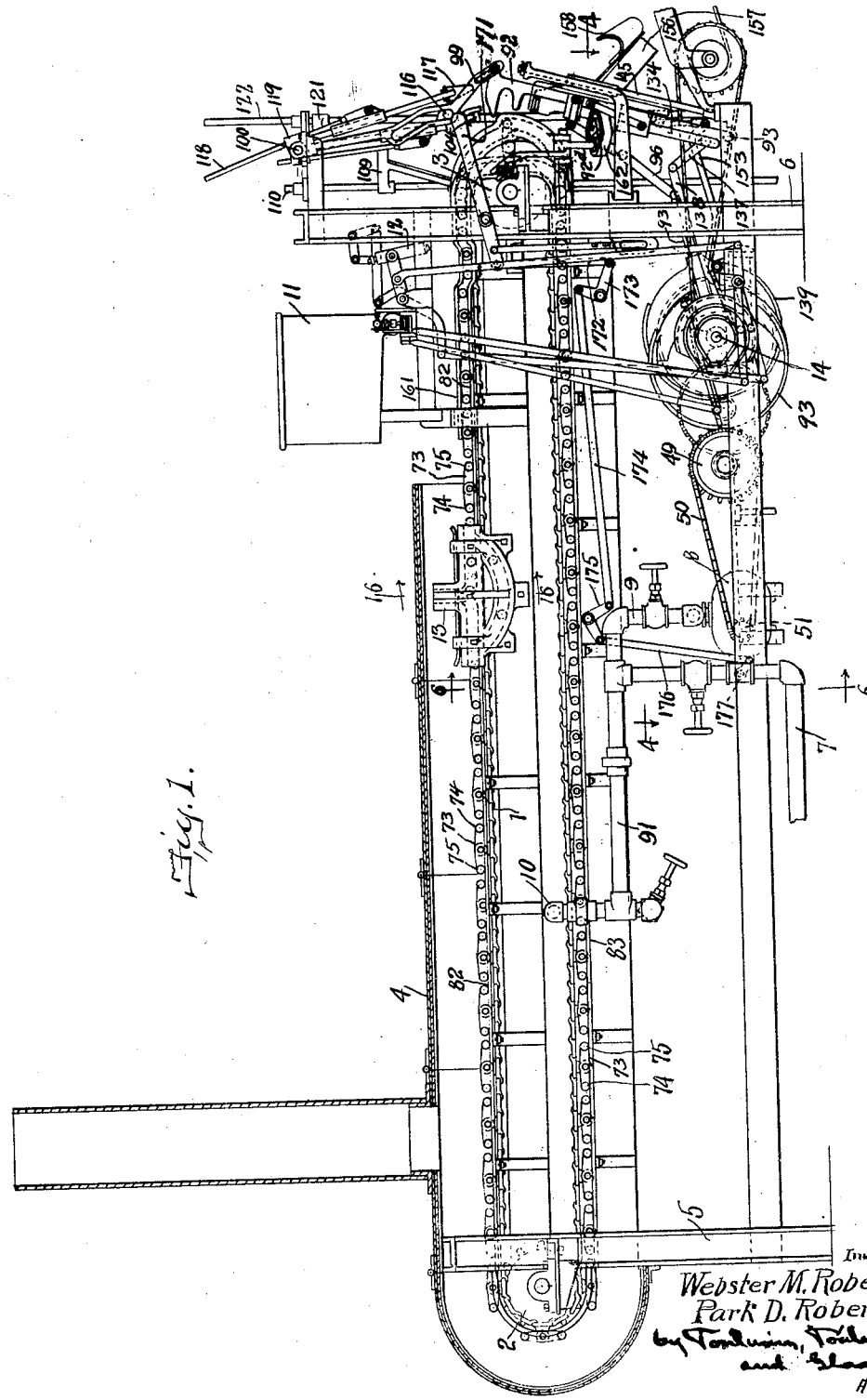

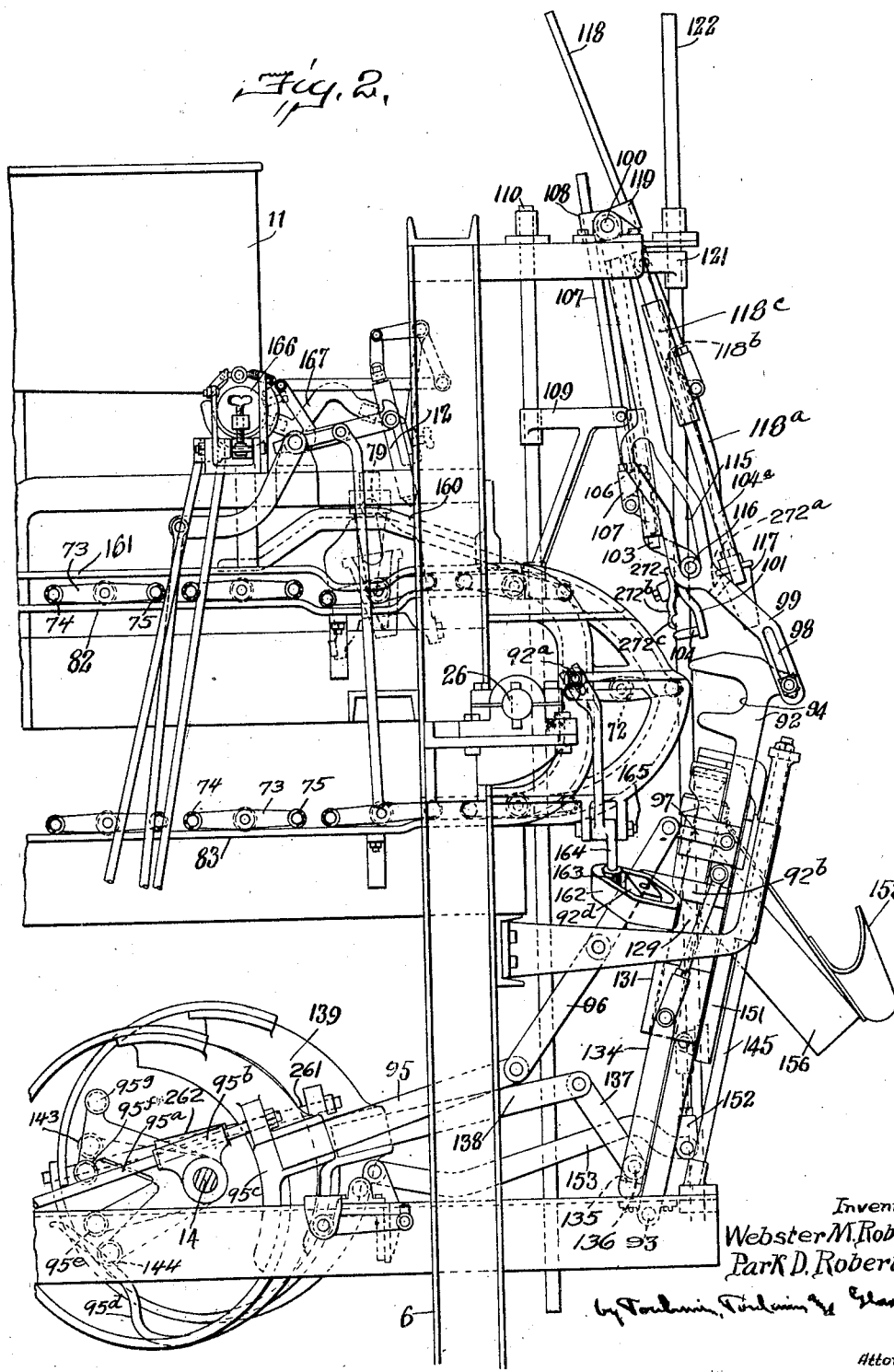

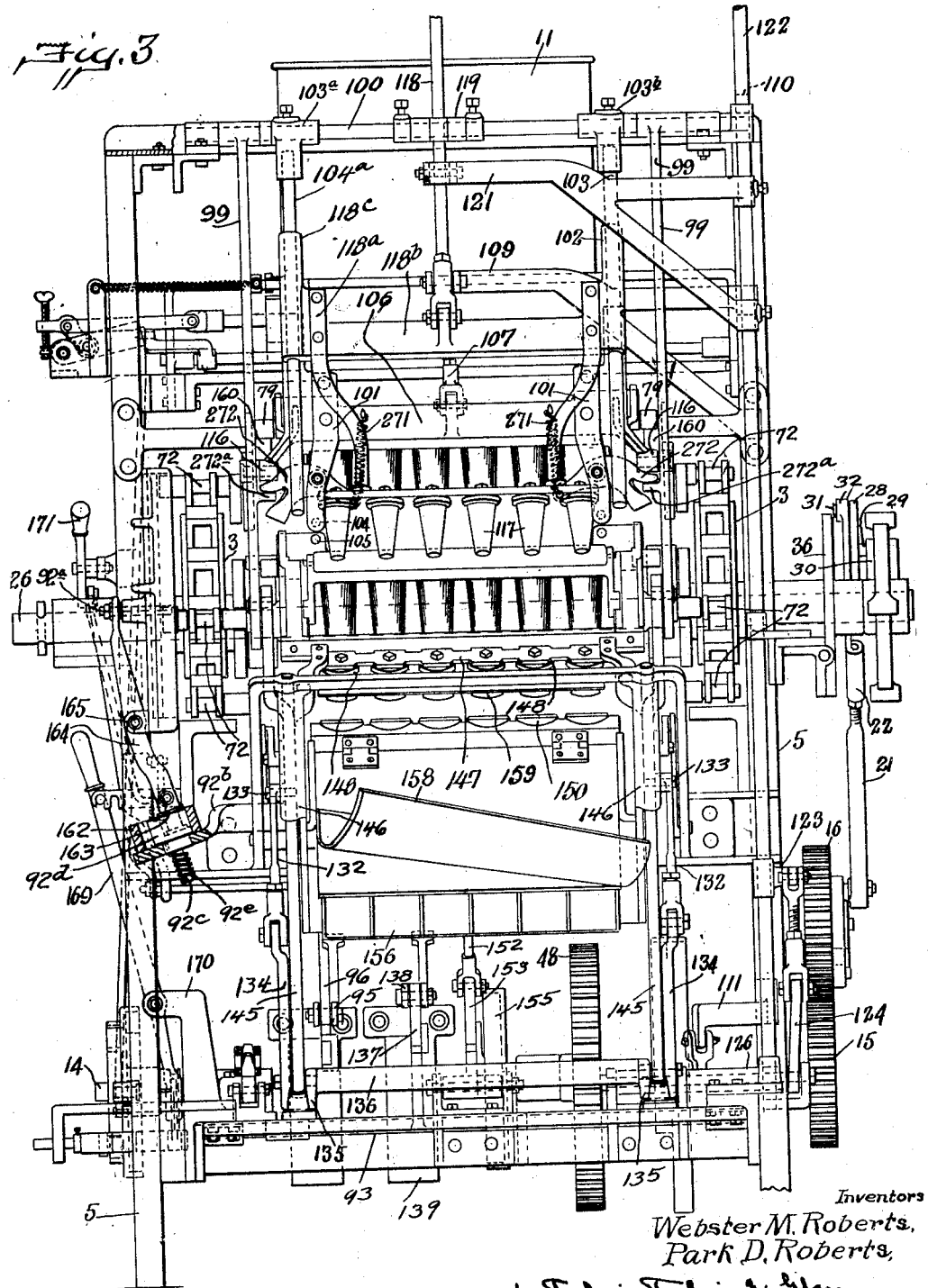

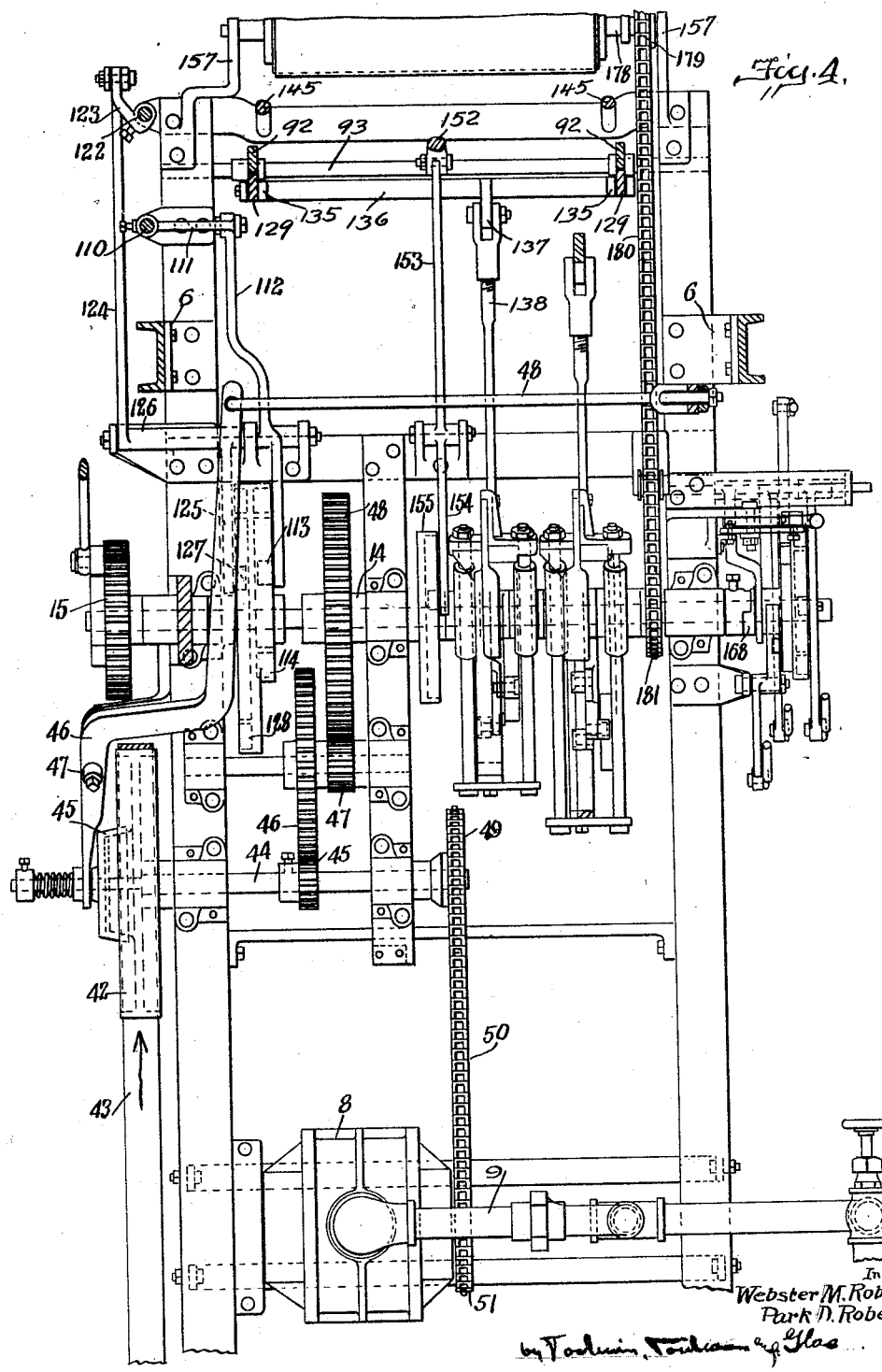

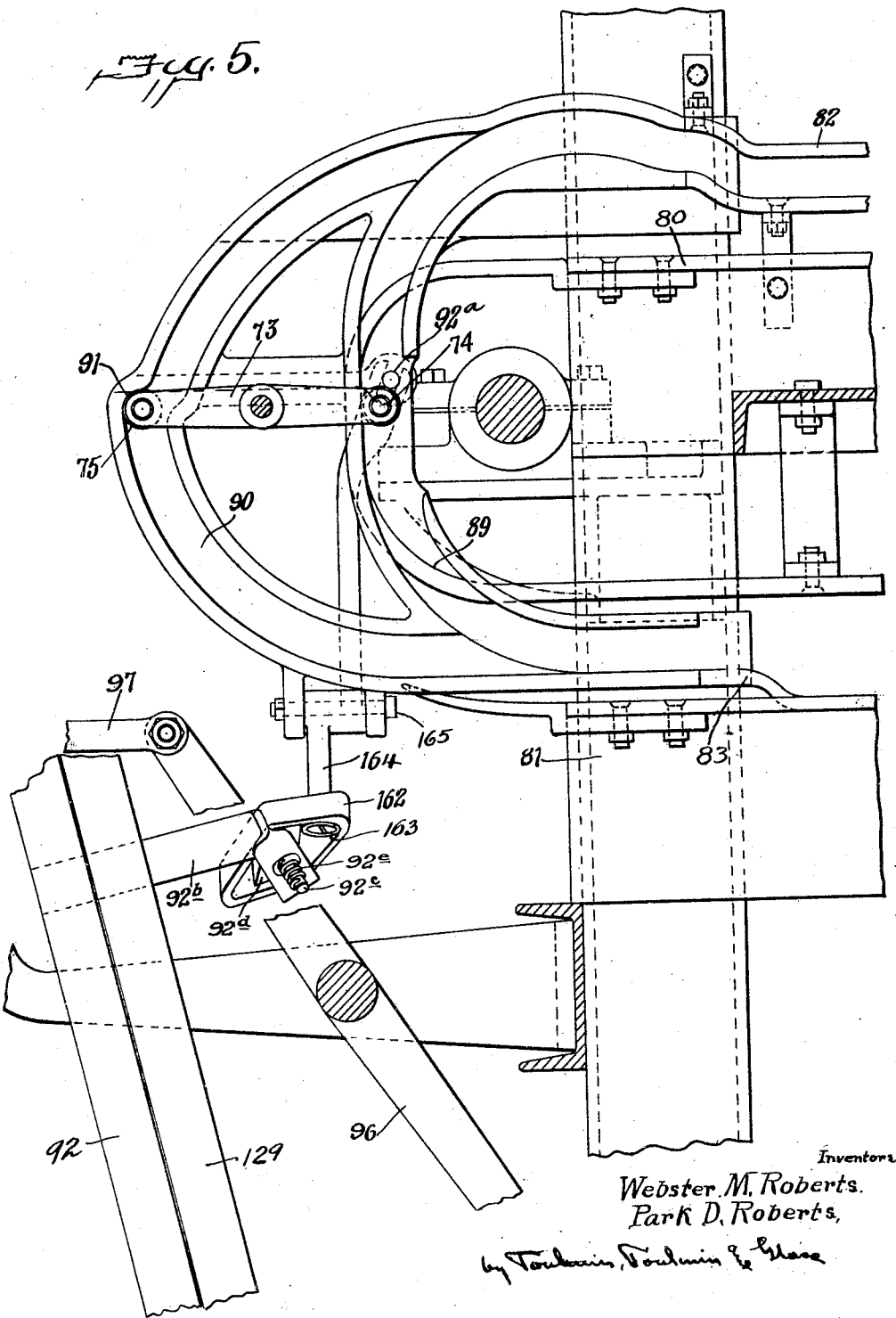

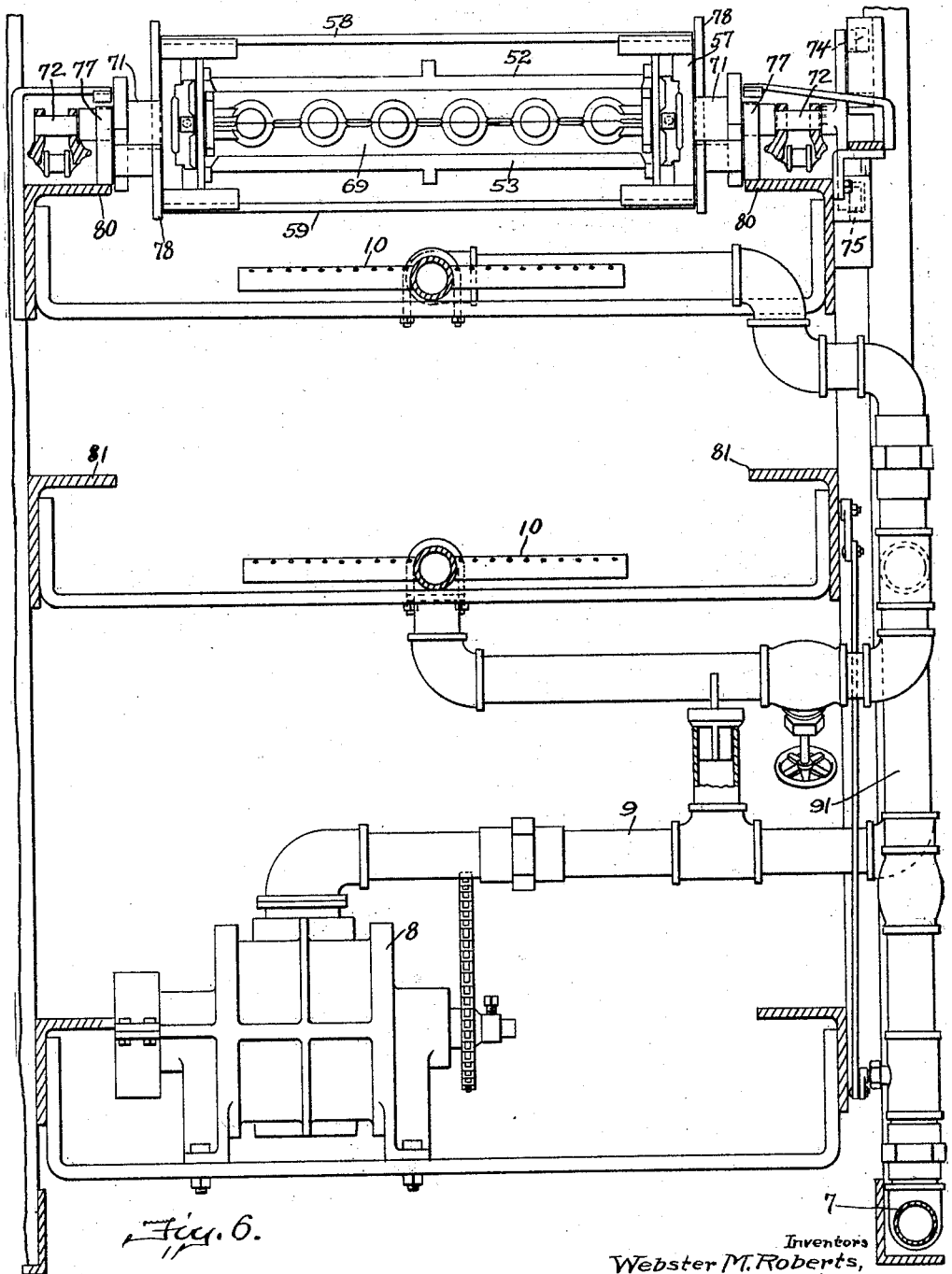

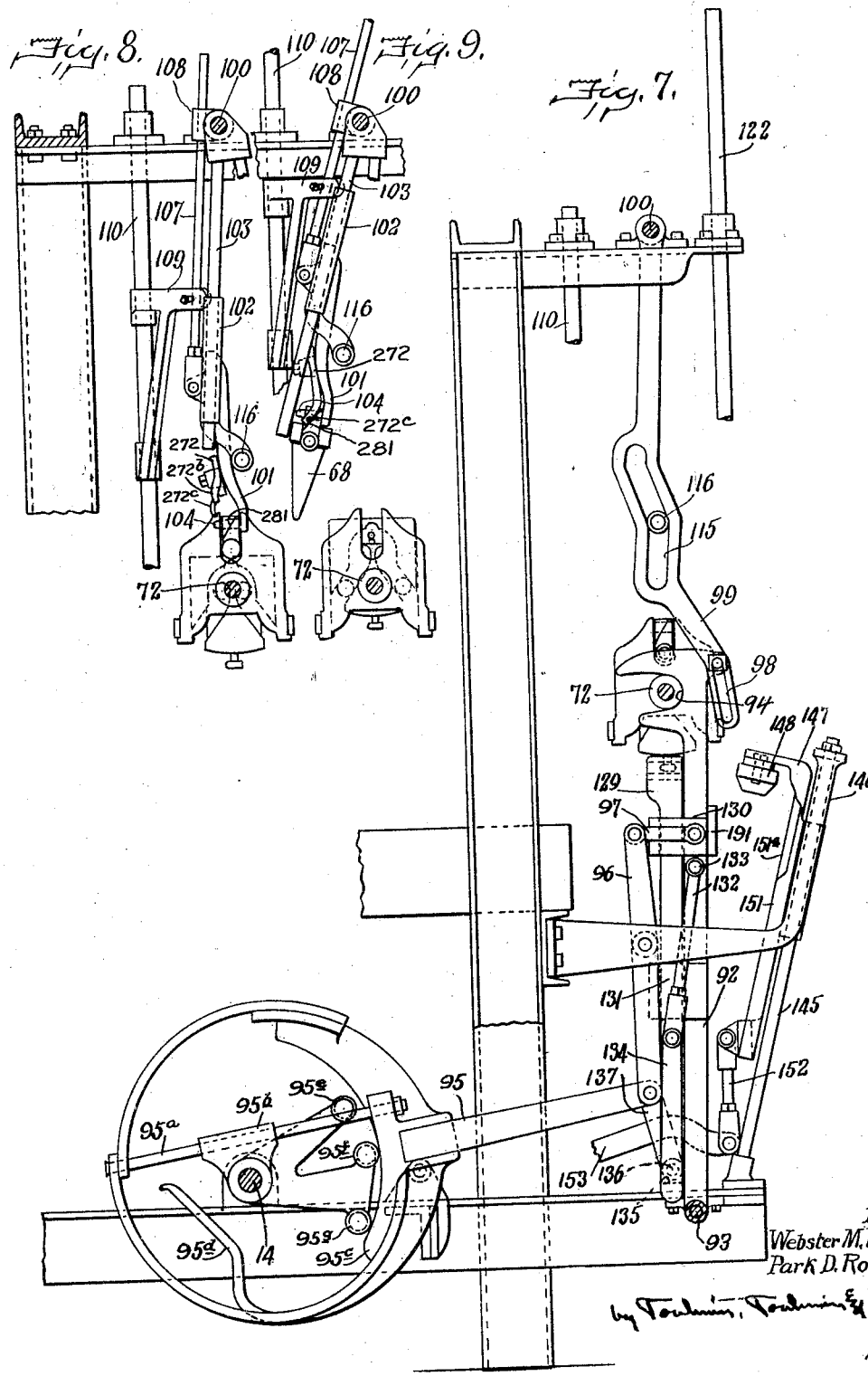

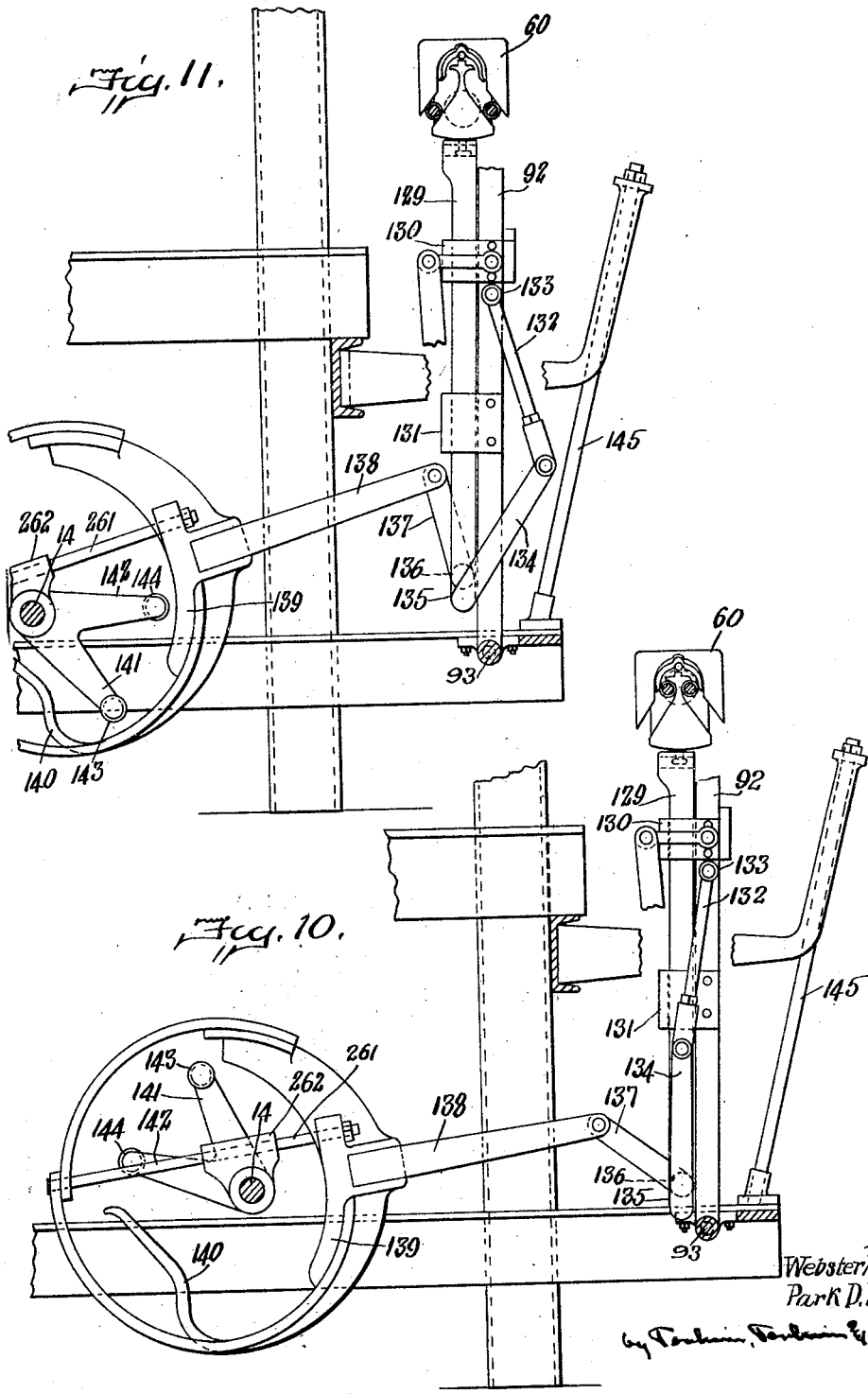

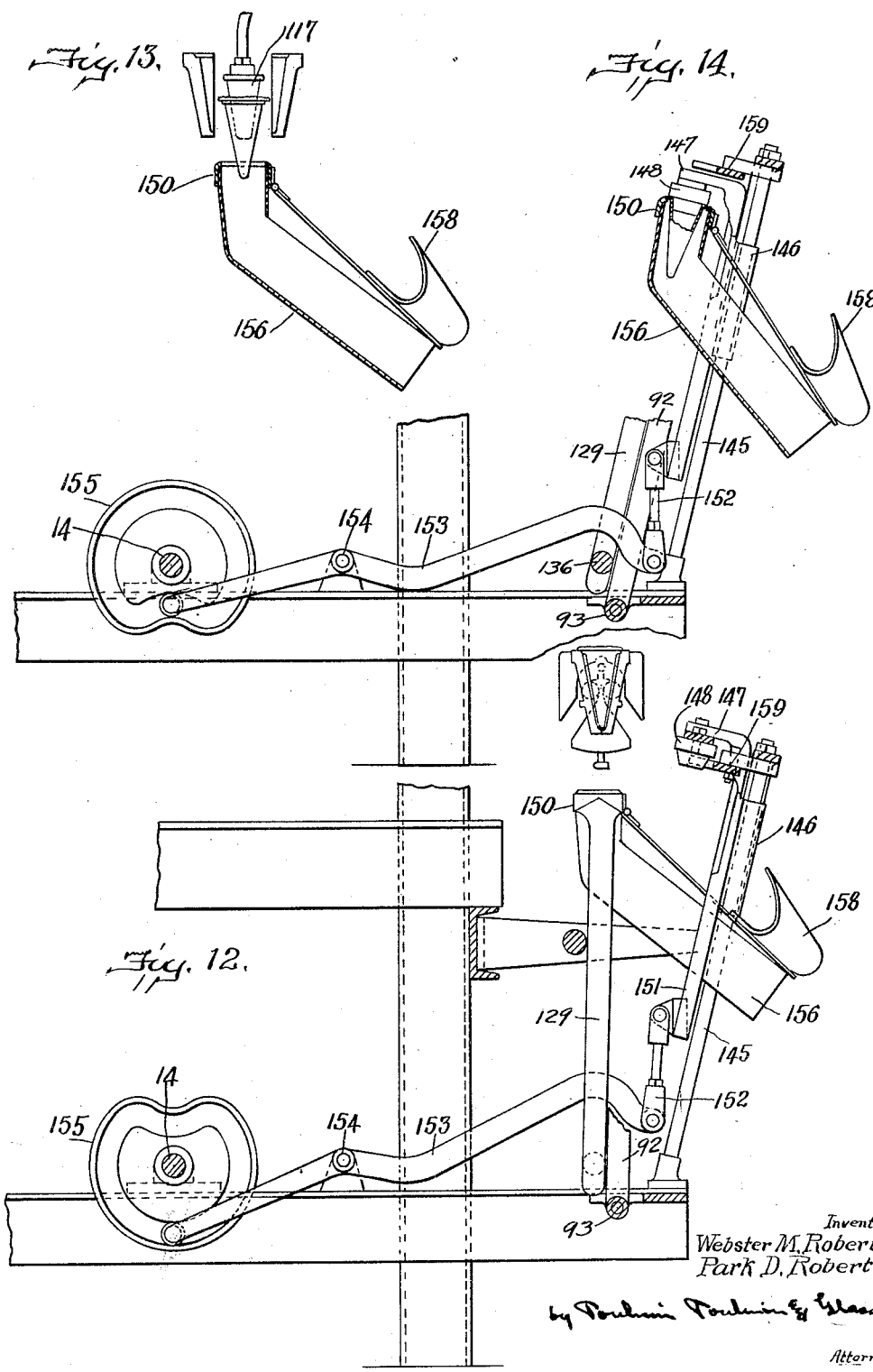

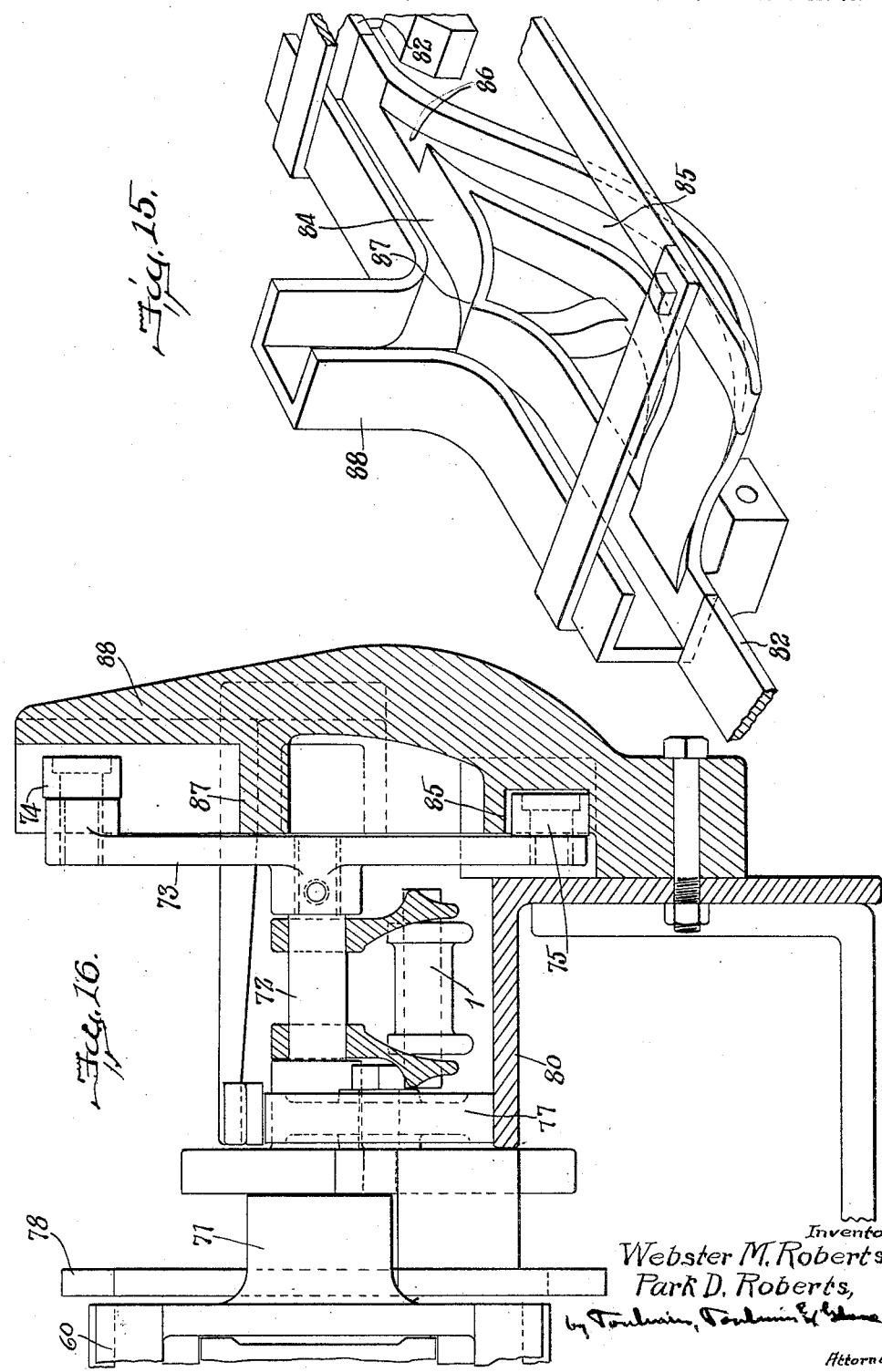

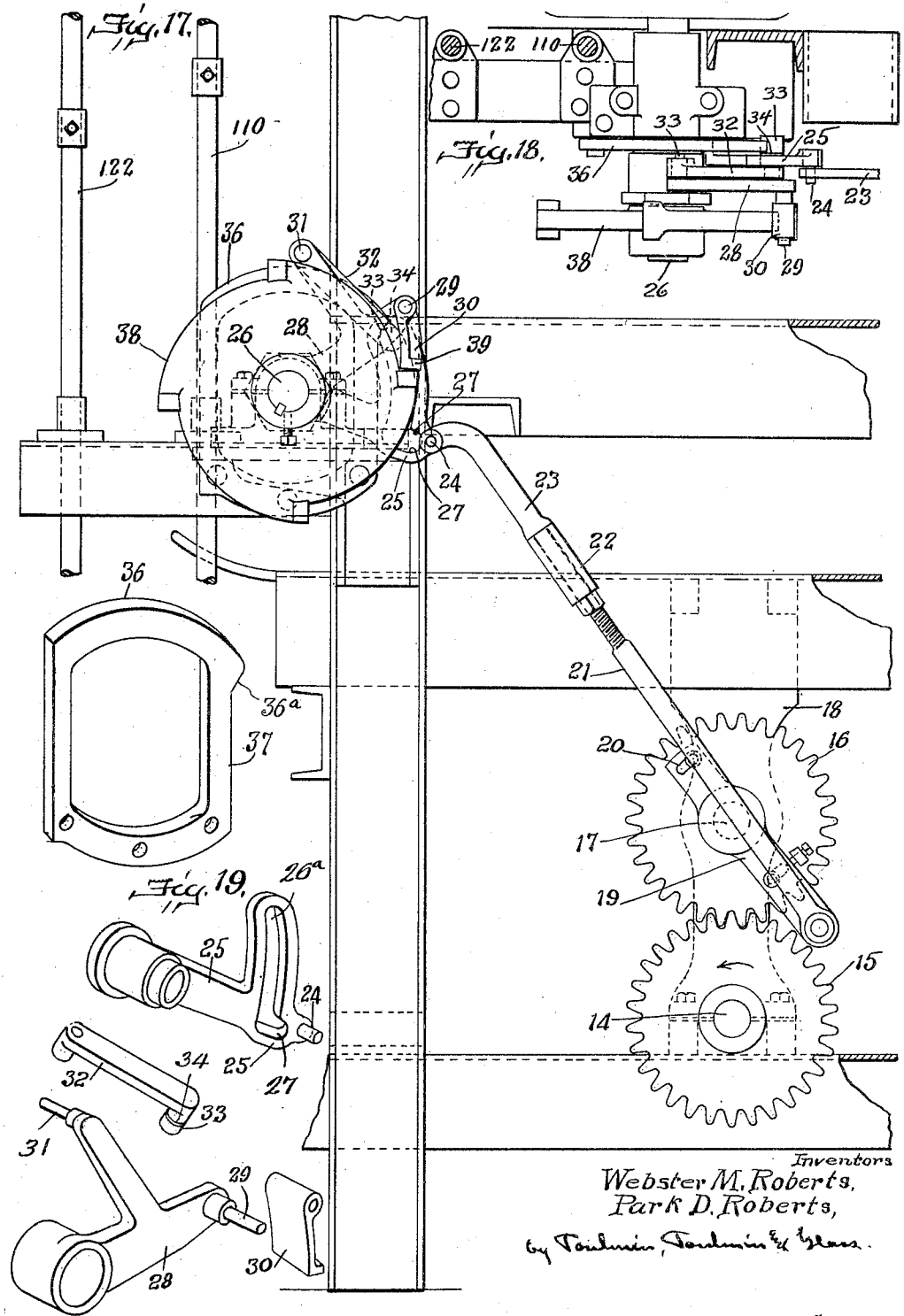

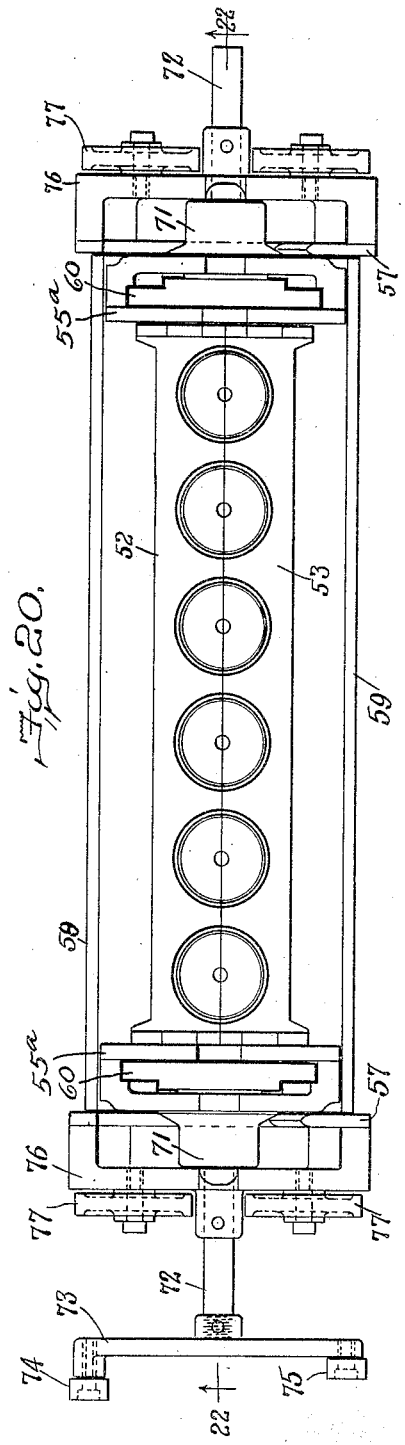
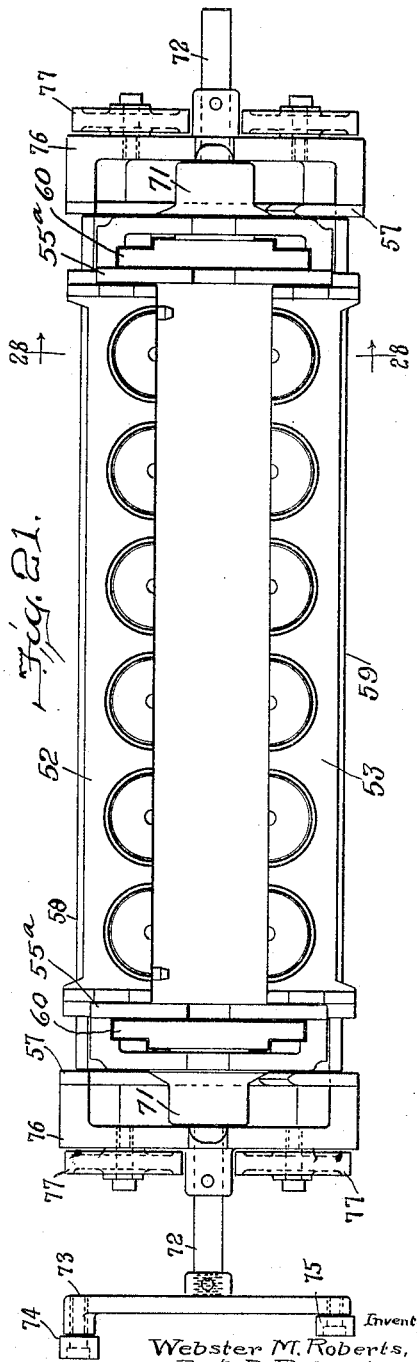

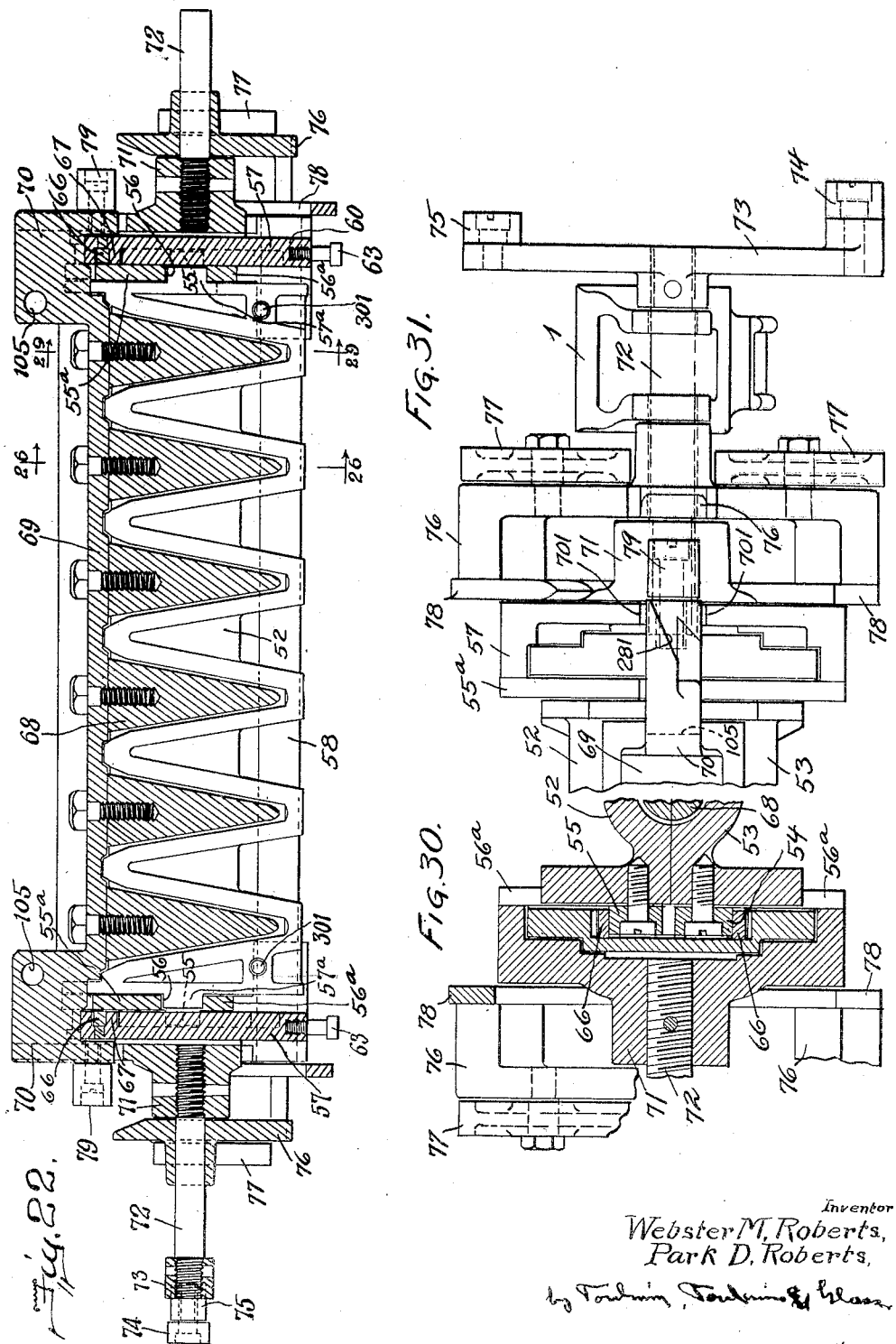

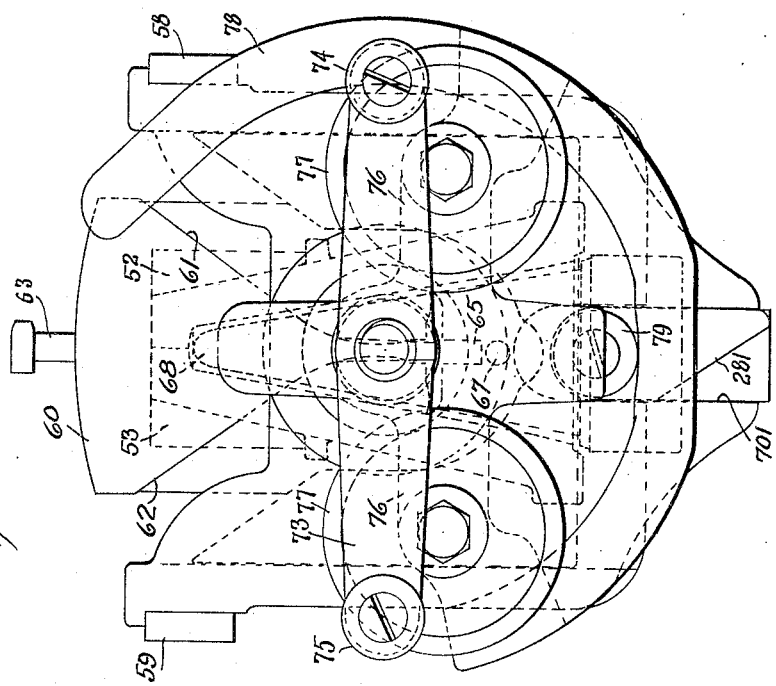
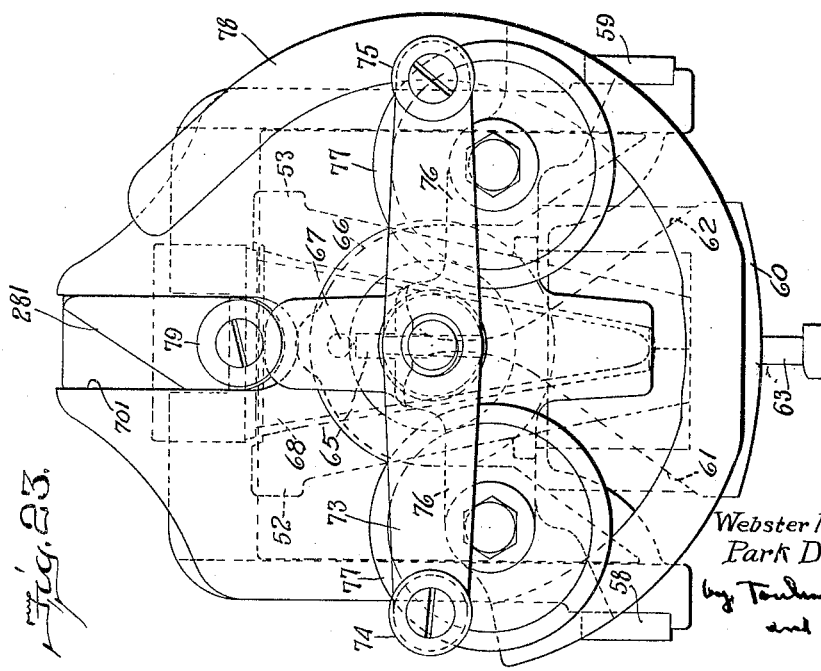

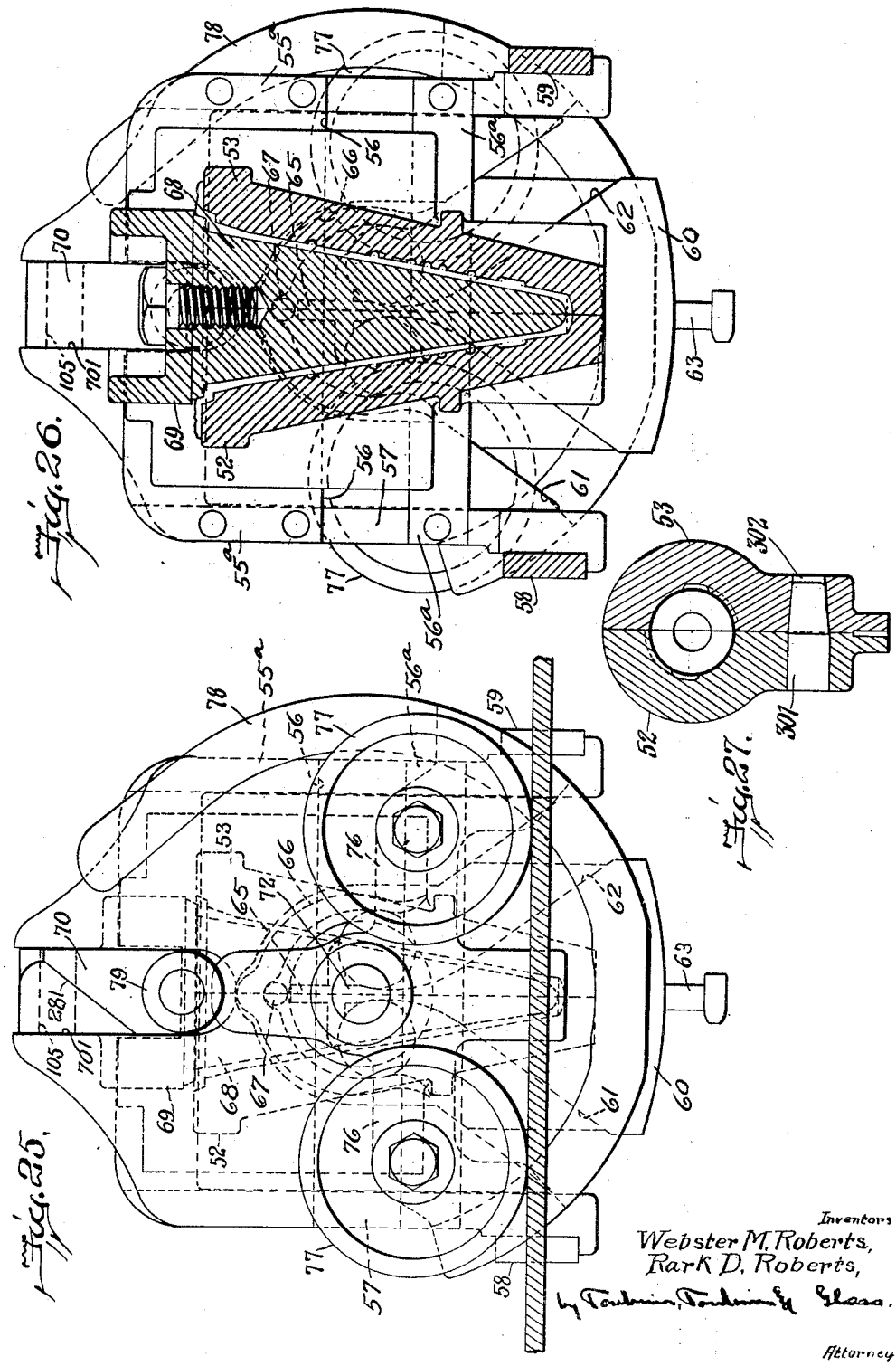

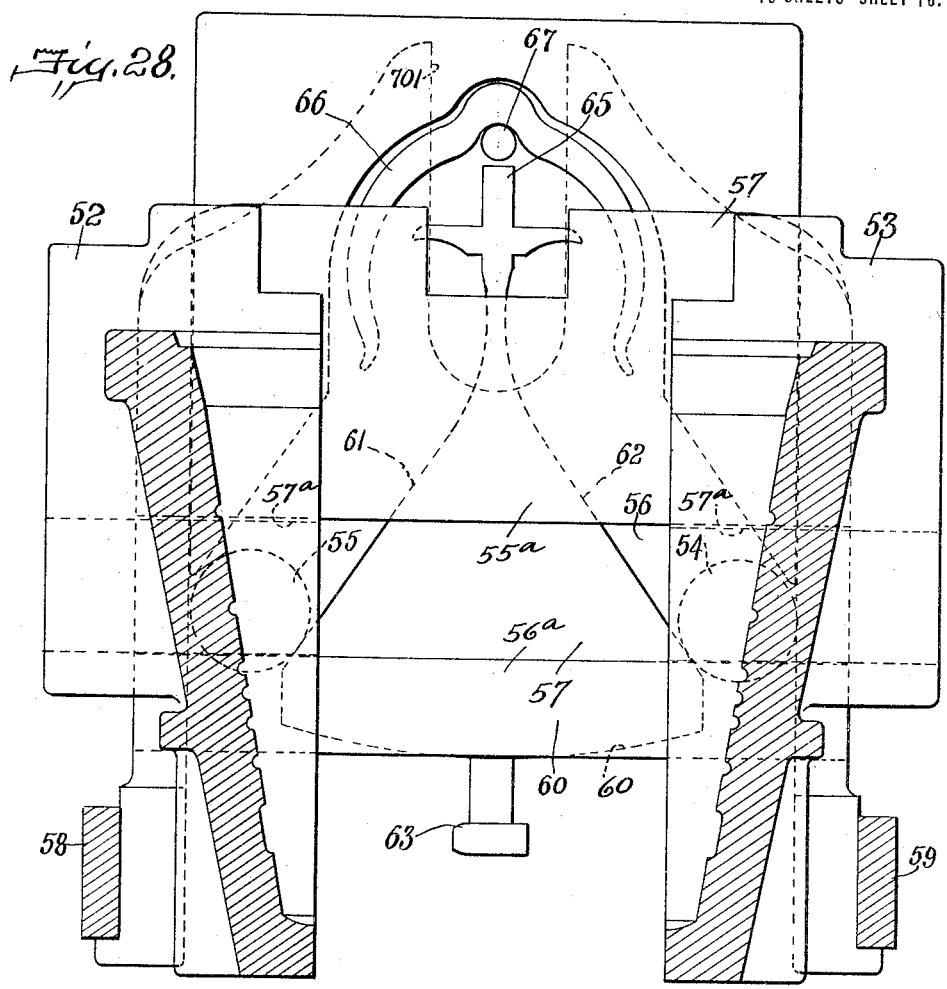

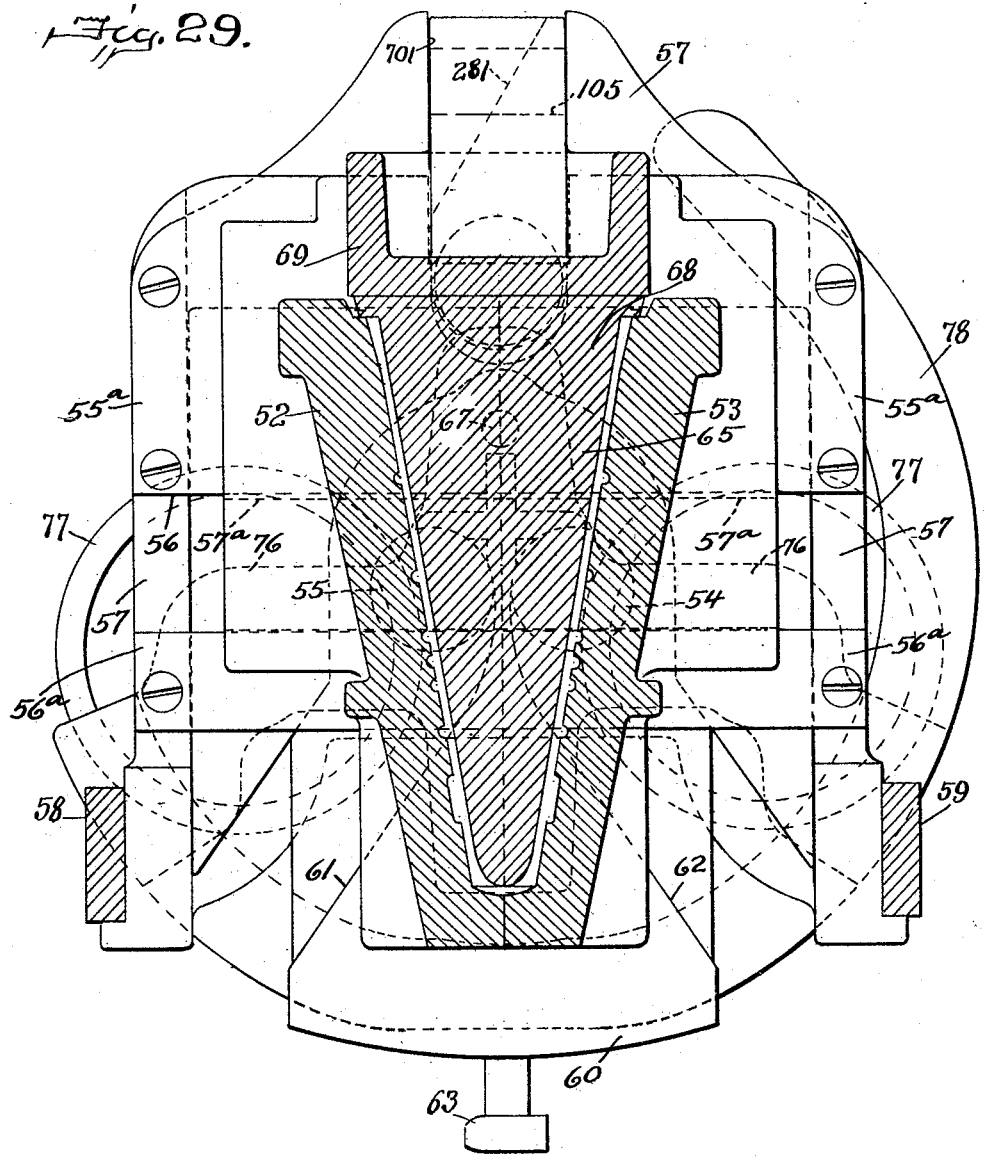

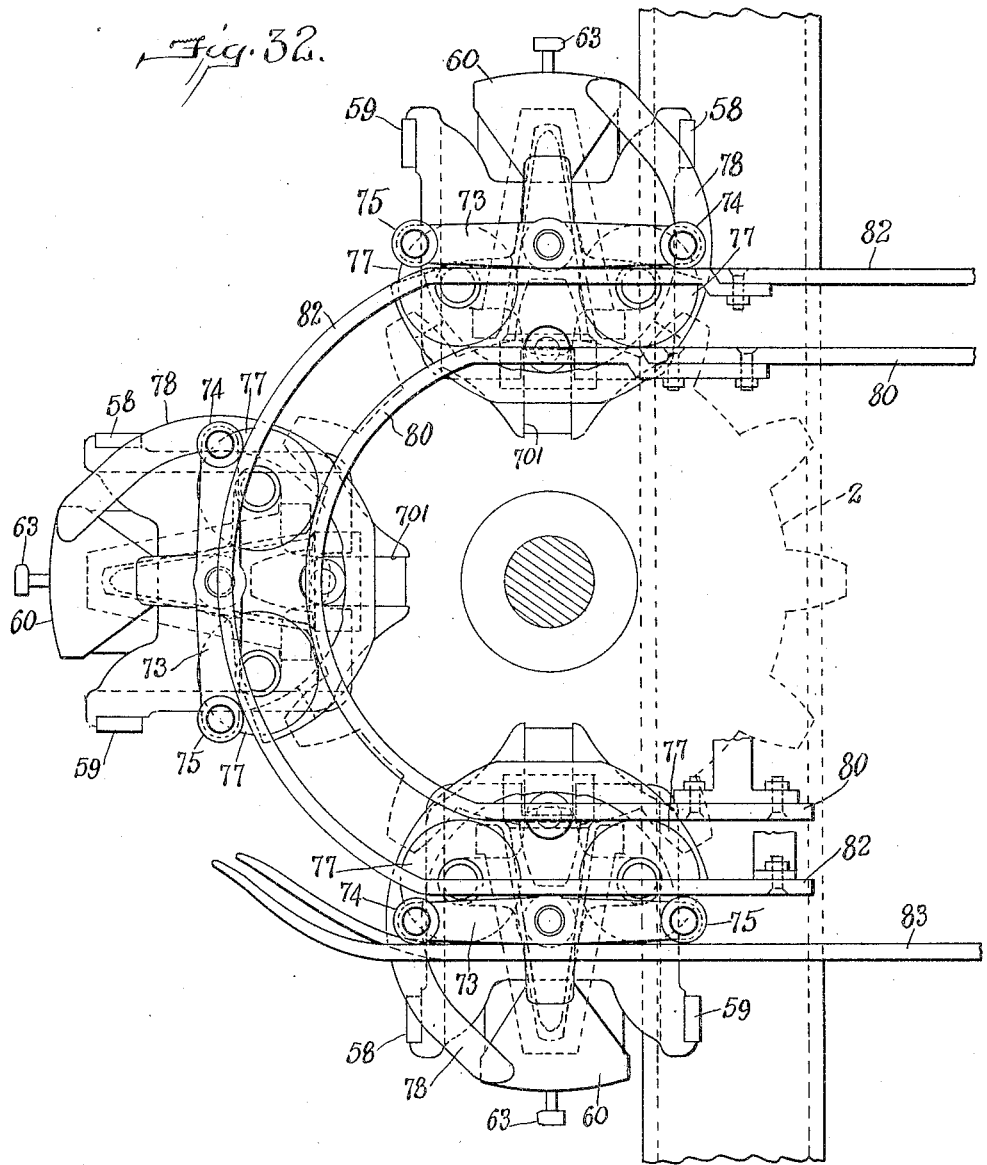

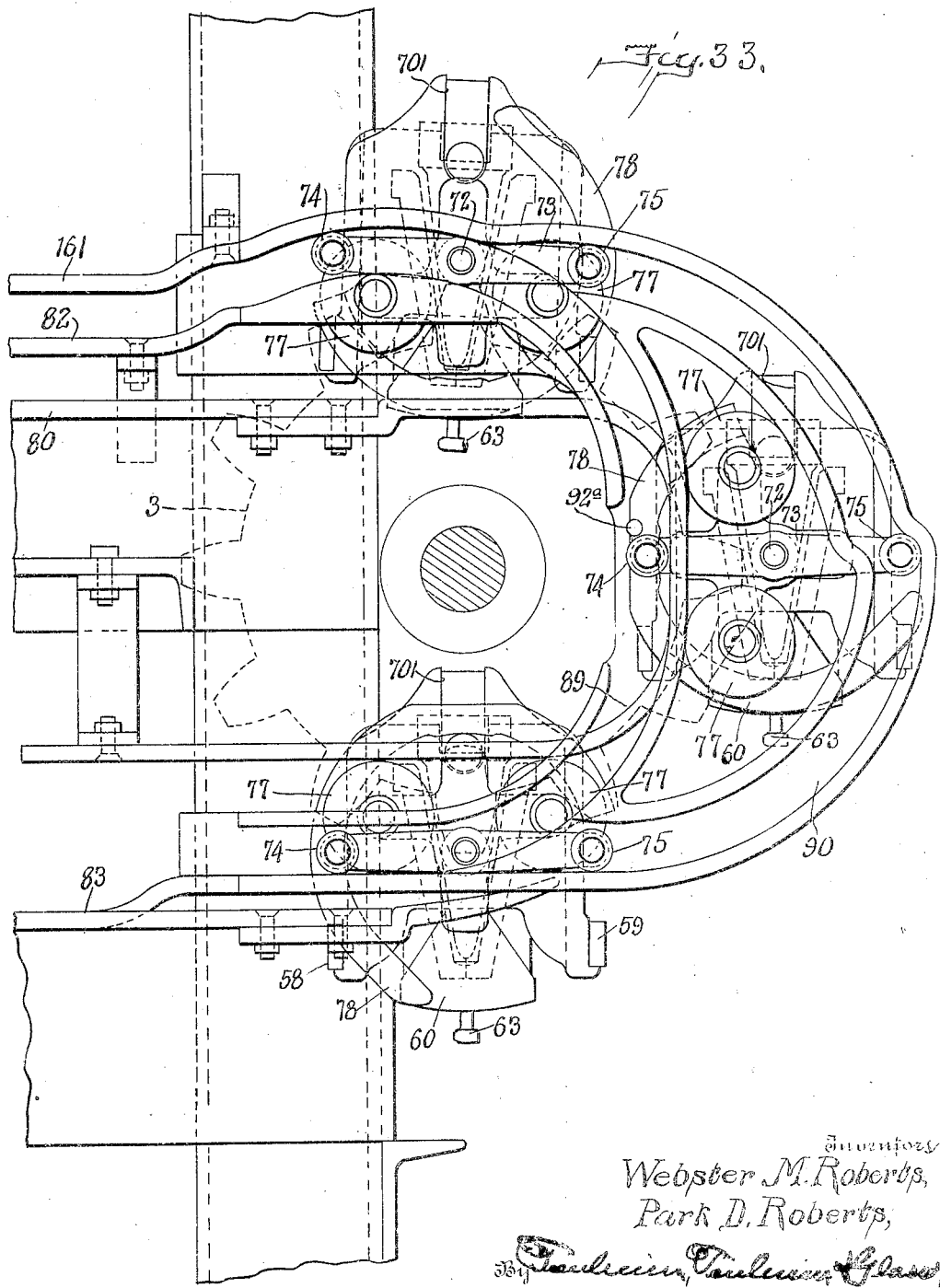

WEBSTER M. ROBERTS AND PARK D. ROBERTS, OF ST. JOSEPH, MISSOURI.

MACHINE FOR BAKING PASTRY PRODUCTS.

1,423,258.  Specification of Letters Patent.  Patented July 18, 1922.

Application filed October 29, 1917. Serial No. 199,149.

*To all whom it may concern:*

Be it known that we, WEBSTER M. ROBERTS and PARK D. ROBERTS, citizens of the United States, residing at St. Joseph, in the county of Buchanan and State of Missouri, have invented certain new and useful Improvements in Machines for Baking Pastry Products, of which the following is a specification, reference being had therein to the accompanying drawing.

This invention relates to machines for baking pastry products, such for example as ice cream cones which are now commonly known and aims to provide an entirely automatic machine for making such products wherein no handling of the batter or dough is necessary until the products are completely baked and have been ejected or discharged from the machine. The construction is shown in connection with a machine for making such ice cream cones, but it is obviously usable to form other articles, the only changes then required being a corresponding change in the shape of the mold itself and the core therefor.

In this improved machine the molds are filled and the product automatically baked. The cores of the molds are withdrawn and the molds are then opened, whereupon certain ejecting devices positively force the baked cones out of the molds and carry them to a cutting device whereby any superfluous material is cut from them so as to cause their being discharged from the machine in perfect form.

An additional object is to provide improved devices for evenly and thoroughly baking such pastry products and to this end the construction is such that the molds are inverted during part of their travel whereby heat is applied to all sides of the mold at some stage of the operation and therefore the products are more evenly baked.

An additional object is to provide improved discharging devices for the baked product, these devices comprising automatic means whereby the sections of the mold are opened and certain ejecting devices positively inserted after the cores are withdrawn from the molds. These ejectors are shaped more or less similarly to the cores themselves and serve to detach the baked products from the mold sections if that is necessary and to force them positively out of the mold, thus inserting them in a cutting device which is practically a punch and die mechanism. The cutting device then automatically cuts the refuse batter so as to perfect the shape of the cone and discharges the baked cone from the machine. Also, an improved mechanism is provided for stripping the refuse batter from the cutting mechanism and permitting its discharge out of the machine.

An additional object is to provide an improved device for permitting the escape of steam from the batter. The batter is, of course, somewhat moist when it is poured into the molds and as these are hot a considerable amount of steam is formed. This steam must be permitted to escape from the mold, but very shortly the amount of steam so escaping becomes less and then the steam escape may be largely shut off. The machine of this invention produces this result by permitting the cores to rest lightly in the molds during the first part of the baking operation and then to force them more tightly into the molds after the greater portion of the steam has escaped.

A further object is to provide improved means for stopping the operation of the devices which automatically fill or load the molds without stopping the rest of the machine. This construction is of advantage when it is desired to start a machine and to preheat the molds and also when it is desired to stop the machine, but to permit the completion of baking of cones which are then in process of being baked in the machine.

A further object is to lock the molds in an erect condition at the discharging position. To this end the mold carrier is held against bodily movement, and the molds themselves are held against any movement of rotation.

An additional object is to provide for making lighter or darker pastry elements by varying separately the supply of gas and air whereby more or less heat may be applied to the molds.

A machine as above described is shown completely in the drawings forming part of this specification and in these drawings, Figs. 1 to 6, inclusive, are somewhat general views; Figs. 7 to 14, inclusive, show the cone discharging mechanism and its different features; Figs. 15 and 16 show means for inverting the molds whereby an even baking is produced; Figs. 17 to 19 show the mechanism for forwarding the molds; and Figs. 20 to 29, inclusive, show details of the mold construction proper. More specifically, Fig. 1 is a general side elevation of the entire machine, though the molds are not shown in this figure and some other parts are omitted. Throughout the specification directions will be assumed to be taken from the standpoint of the right hand end of Fig. 1, this being termed the front or operator's end of the machine. The left hand end in Fig. 1 will be termed the rear or oven end of the machine. Thus the side nearest the reader in Fig. 1 is the left side of the machine and the opposite side the right hand side.

Fig. 2 is an enlarged detail view of the parts shown in Fig. 1 at the operator's end of the machine.

Fig. 3 is an end elevation of the machine looking from the operator's end or in other words from the right hand end of Fig. 1.

Fig. 4 is a longitudinal horizontal section of Fig. 1 on the line 4—4, showing the main operating cam shaft and the parts for moving that shaft, together with the parts operated thereby.

Fig. 5 is a view of the mold reversing mechanism at the operator's end of the machine. This view is taken looking in the opposite direction from view 4.

Fig. 6 is a vertical section on the line 6—6 of Fig. 1 showing the mold reversing mechanism and the method of heating the molds.

Fig. 7 is a detail view of parts of the operator's end of the machine whereby the molds are prevented from moving as a whole but the mold sections may be opened to discharge the cones therefrom;

Fig. 8 is a detail showing the devices for withdrawing the cores from the molds.

Fig. 9 shows the parts of Fig. 8 in operated position.

Figs. 10 and 11 show the mechanism for opening the mold sections, Fig. 10 showing the parts in normal position and Fig. 11 showing the mold sections opened.

Fig. 12 shows the cutting mechanism whereby superfluous batter is cut from the cones. In this figure the die member is in position to receive the baked cone from the open mold.

Fig. 13 is a similar view but with parts not shown. In this figure the cone has been partially pushed into the die member of the cutter.

Fig. 14 is a similar view with the mold not shown in which the punch member is entering the die to cut the superfluous material.

Fig. 15 is a perspective view of tracks which cause inversion of the molds.

Fig. 16 is a vertical section on the line 16—16 of Fig. 1 showing a mold half inverted.

Fig. 17 is a detail view taken from the right hand side at the operator's end of the machine, showing the mechanism for advancing the molds in uniform steps;

Fig. 18 is a plan view of the mold advancing mechanism.

Fig. 19 is a collection of detail views showing the parts separated.

Figs. 20 and 21 are top plan views of the mold unit, Fig. 20 showing the mold sections closed and Fig. 21 showing them open.

Fig. 22 is a vertical transverse section on the line 22—22 of Fig. 20.

Fig. 23 is an end elevation of the mold unit looking from the left hand end of Fig. 20 and showing the mold in erect position.

Fig. 24 is a view similar to view 23, but showing the mold inverted.

Fig. 25 is also an end elevation of the mold unit, but with many of the parts not shown. This figure shows the rollers on which the mold units move.

Fig. 26 is a section through the mold unit, being taken on the line 26—26 of Fig. 22.

Fig. 27 is a detail showing the means for holding the two sections of the mold units in proper relation.

Figs. 28 and 29 are enlarged views, being transverse sections on the line 28—28 of Fig. 21 and the line 29—29 of Fig. 22 and in these figures, Fig. 28 shows the mold sections open and Fig. 29 shows them closed together.

Fig. 30 is a horizontal sectional view of one end of one of the mold units;

Fig. 31 is a plan view of an end of one of the mold units;

Fig. 32 is a side elevation of the left end of the machine with parts broken away, showing the track construction and the manner in which the mold units are reverted as they are carried over the sprockets from the upper to the lower tracks; and Fig. 33 is a side elevation of the front or right end of the tracks, showing the manner in which the molds are prevented from being inverted as they are carried over the sprockets from the lower to the upper tracks.

The machine comprises generally a travelling mold carrier shown as an endless belt on which the mold units are mounted. As shown each mold unit comprises six molds, though this number is not essential and each mold unit comprises two sections which may be separated to permit withdrawal of the baked products. Core units, one for each mold unit, are provided and thus there are six cores shown in each core unit. The molds are filled by certain batter nozzles which are projected between the sections of the mold unit and then the movement of the endless belt carries the filled molds through an oven in which the batter is baked. The molds are erect or right side up when filled and are maintained in this position for a short time inasmuch as the batter is quite fluid at this stage. The batter soon becomes viscous, however, and then the molds are inverted so as to cause an even baking. The molds are reverted by passing around a sprocket at the oven end of the machine and then travel erect until they again reach the operator's end of the machine. Here they are kept erect by certain reversing tracks and the operation of discharging the baked product from the molds takes place entirely at a single position at the operator's end.

A brief statement showing the general relation of the parts with reference made to Fig. 1 will be first given for clearness and then the detail description of the parts taken up. The travelling belt 1 is carried around sprockets 2 at the oven end and 3 at the operator's end of the machine. It is moved in steps by the driving mechanism, each step being equal in extent to the space between adjacent mold units. This distance may, in practice, be about eight inches and there may be some forty mold units in a single machine. An oven 4 is indicated generally in this figure, but its construction is not material to the invention. Frame pieces 5 and 6 are shown, but the mechanism may, of course, be supported in any desired way. The oven 4 and the molds are heated by mixed gas and air, the gas being supplied through a pipe 7 and air being furnished by an air pump 8 from which air passes to mix with the gas through a pipe 9. Fig. 1 shows a single burner 10, but some of the figures show additional burners and as many as are desired may, of course, be employed. In Fig. 1 the movement of the belt is from right to left on the upper portion thereof and the molds are filled with batter from a tank 11 just after they have passed the sprocket 3 at the operator's end and travel to the rear of the machine along the upper side of the belt 1. From the batter tank 11 batter nozzles 12 serve to carry the batter into the mold units. As the molds pass directly under the batter tank 11 they are erect or right side up, but shortly thereafter are inverted by a reversing mechanism 13 and from this location they remain inverted until they reach the sprocket 2 at the oven end of the machine. The mere passing of the molds around this sprocket serves to revert them to erect position and they remain erect during their entire travel along the lower portion of the belt 1 until they again reach the operator's end of the machine. Here they would be again inverted by the passing around sprocket 3, but a mechanism is provided which prevents this and keeps them erect as they pass around this sprocket. The discharging position for the molds is at the right hand of Fig. 1, the mold when in discharging position being in a horizontal line with the center of the sprocket 3. At this point a pivoted arm is oscillated to prevent vertical movement of the molds and this arm is also employed to control the movement of the mechanism for withdrawing the cores and for ejecting the cones from the molds. The cones when so ejected pass to a cutting mechanism and lodge on a die member thereof. Thereafter they are moved to a position such that the punch member may pass inside the die member and thus detach any superfluous material from the cones. Each step of the travelling belt brings a mold unit to filling position and another mold unit to discharging position.

With this general statement the detail description may be given and it will follow about the order in which the cones themselves move through the machine. However, the description will assume that the molds have been filled or in other words that the mold units have passed to a position, for example, directly under the batter tank 11. Thus, the actual filling of the molds will be the last part to be described.

It was stated that the belt 1 is moved in steps which in practice may be about eight inches in extent and must in all cases be equal to the distance between the mold units. In the present invention this stepping of the mold units is given by mechanism in Figs. 17 to 19. In Fig. 17 the main cam shaft of the machine is indicated by numeral 14. The manner of operating this shaft will be given later, but it may be here stated that it continuously rotates in a counter-clockwise direction. Fast to this shaft is a gear 15 meshing with a similar gear 16 carried loosely on a stud 17. As shown, a frame bar 18 supports this stud. A crank arm 19 is journaled loosely on the shaft 17 and is connected with gear 16 by slot and pin connections 20. As shown, these simply permit slight movement of the crank arm 19 relative to the gear 16. Connected to the crank 19 is a pitman 21 having an adjustable connection 22 with an arm 23. This latter arm is pivoted by a pin 24 to a pawl operating arm 25 journaled loosely on a shaft 26 which is the supporting shaft for the belt sprocket 3 at the operator's end of the machine. As shown in Fig. 19, this pawl operating arm 25 has a circular slot 26ª having a radial portion 27. An arm 28 is journaled loosely on a hub on arm 25 and a pin 29 carried thereby supports and drives an operating pawl 30. The arm 28 is provided with a second pin 31 and to this pin is pivoted an arm 32 having a roller 33 which rides in the slots 26ª and 27 of pivoted arm 25. A second roller 34 beside roller 33 rides on the cam edge 36 of a cam plate 37 held fast in a position to surround the shaft 26. Fast on the driving shaft 26 is a ratchet 38 shown as having four teeth and with these teeth the operating pawl 30 is adapted to engage. When the gear 16 is rotated and the pitman 21 thereby oscillated an oscillating movement is given the pivoted arm 25. This causes no movement of arm 28 as long as roller 33 rides in the circular portion 26ª of the slot in arm 25. But when this roller reaches the radial portion 27 it may move therein and then further movement of pivoted arm 25 will cause movement of arm 28 and operating pawl 30. The pawl on its return movement will engage the next tooth of ratchet 38 and move it a certain extent, depending on the cam edge 36 of the cam plate 37. When the roller 34 rides off this cam edge the roller 33 is permitted to move out of radial slot 27 and then the further movement of the pivoted arm 25 does not cause corresponding movement of the pawl arm 28 and therefore the movement of ratchet 38 and shaft 26 ceases. It will be seen that the exact extent of operation of pawl 30 may be adjusted by moving the connection 22 and the exact time relative to the movement of gear 16 may be slightly adjusted through the lost motion connections 20 by which crank arm 19 is connected to gear 16. Thus, it will be seen that the mold carrying belt 1 is moved in steps and the construction is such that only a small part of the time is employed in moving the molds from one position to the next. Also, the movement starts gradually because of the crank connection to the operating devices, and while the movement of the mold may be rapid after it has started nevertheless it also comes to rest gradually.

The shape of slot 27 is such that roller 34 tends to move to uncoupling position in slot 26ª and will do so when released from cam edge 36. The portion 36ª of this cam permits roller 34 to move gradually out of slot 27 and thus stop the belt and the molds gradually. The molds have a very considerable weight and thus it is of great advantage to start or stop them gradually. However, it is also desirable to take a small proportion of time as possible in the movement of the molds and thus to allow a great proportion of time for the molds to stand over the burners, and for the operation of the mold discharging devices. The parts described accomplish both these objects by starting and stopping the molds gradually but moving them rapidly through the larger part of their travel.

In order to heat the oven and the molds a mixture of gas and air is employed. The gas may be supplied from any desired source through a pipe 7 shown in Figs. 1 and 6 and an air pump 8 is employed to furnish air to make the correct mixture. As shown in Fig. 6 this air pump is of the centrifugal type and it is driven from the main operating mechanism of the machine. The air is drawn in at the bottom of the pump and forced out through a pipe 9 at the top thereof which connects the pump to the gas supply pipe. From this junction the pipe 91 for the mixture passes through the machine. In Fig. 6 a single burner 10 directly under the lower range of molds is shown and a single burner 10 is shown in connection with the upper range of molds. Of course, in practice additional burners would be employed as might be necessary to maintain the proper degree of heat.

The machine is driven entirely from a single operating motor or motor mechanism, the motor itself being not shown in the figures. There is shown in Fig. 4 a belt pulley 42 which may be driven by a belt 43 from an electric motor or from any other source of motive power. The pulley 42 is loose on a shaft 44 and is adapted to be connected thereto by a clutch 45. The clutch is controlled by a hand lever 46 which may be pivoted on a pin 47 and may have connected to it a link 48 reaching to any desired point at the operator's end of the machine. Thus to start or stop the machine it is necessary merely to tighten or loosen the clutch 45. The shaft 44 is provided with a sprocket 49 connected by a chain 50 to a sprocket 51 which serves to drive the air pump 8. The shaft 44 is also connected through reducing gearing comprising pinion 45, gear 46 driven thereby, pinion 47 fast to gear 46 and a large gear 48 whereby the main cam shaft 14 of the machine is constantly driven. This shaft appears in Figs. 1 and 2 and in these figures the movement of the shaft is in a clockwise direction. The shaft 14 carries a considerable number of cams which operate the cone discharging devices and the batter filling mechanism and also, as before described, serves to operate the mold advancing mechanism of Fig. 17. In Fig. 4 the gear 15 which drives the mold advancing devices is shown at the extreme left of the figure.

Referring now to Figs. 20 to 29, inclusive, the detail construction of the mold units themselves is there shown. Each mold unit is shown as comprising six actual molds or mold elements but this number is not essential. The mold sections 52 and 53 are cast integrally and are adapted to be moved toward and away from each other as seen in Figs. 20 and 21. In order to cause this movement of the mold sections they are provided with rollers 54 and 55 mounted on ribs 54ª on the ends of the mold sections, these ribs riding in horizontal slots 56 of the carrying plates 57. These plates at each end of the mold units are connected together by frame bars or plates 58 and 59, whereby a rigid rectangular frame is produced. Separation of the rollers 54 and 55 serves to separate the sections of the mold unit and this is caused by vertically moving plates 60, best shown in Figs. 28 and 29, these plates having cam tracks 61 and 62 and being provided with a depending knob 63. Fig. 29 shows the parts of the mold unit in closed position and the rollers 54 and 55 in adjacent portions of the cam tracks 61 and 62. Elevation of the knob 63 from the position of Fig. 29 to that of Fig. 28 serves to separate the rollers as shown in Fig. 28 and thus to move the mold sections apart. When the plate 60 carrying cam tracks 61 and 62 again descends the mold sections are brought together and the rollers finally engage a part of plate 60 shown as a rectangular cross 65. The rollers are held against the part 65 by a stiff spring 66 which is prevented from being detached from plate 60 by a pin 67. When the cam plate is moved from the position of Fig. 29 to that of Fig. 28 the spring 66 and the cross 65 are carried away from the rollers whereupon they may be separated by the cam tracks 61 and 62. During the downward movement of the controlling parts the cam tracks 61 and 62 force the rollers together and they finally engage the bottom portion of the arms of springs 66, forcing these arms apart and then are surrounded by the spring 66 which forces them against the arms of the cross shaped piece 65. Thus, the mold sections are held against accidental detachment.

The core elements 68 are all mounted on a common core bar 69, provided with angle extensions 70 at its ends, the angle extensions being cut away above plates 60 so that the core bar 69 rests on plates 60, as shown in Fig. 22. Slots 701 in the upper portions of mold frame plate 57 guide the extension 70. Thus the core bars are held in position by their weight and are held from movement laterally by the upward projection of plate 57. Thus the cores are properly centered in the molds, and are guided to position by the slot 701.

The springs 66 hold the mold sections yieldingly together, and in ordinary operations, these sections abut each other closely. But in case a portion of baked material is not removed at the discharging position, the mold units may close as far as permitted by the presence of material. The springs thus yield and do not force the mold sections together tightly. This spring construction avoids the frequent breakage of molds found in machines where the sections of the mold are positively forced together and locked.

The frame plates 57 of the mold units have cylindrical extensions 71 fast in which are shafts 72 projecting at each end of the mold units. At one end, shown at the left of Figs. 20 to 22, there is fast on shaft 72 an arm 73 provided at its opposite ends with rollers 74 and 75. It will be observed that roller 74 projects further from the arm 73 than does roller 75 and this is for the purpose of inverting the mold units as desired. The sprocket links of the belt 1 are attached to the shafts 72 just outside the mold units, as shown in Fig. 3.

Journaled on the shaft 72 (Fig. 25) at each end of the mold units are plates 76, these plates each supporting two rollers 77 on which the mold units rest. These rollers are intended to engage a track as later described, whereby the movement of the mold units is easily obtained and their weight does not rest at all on the sprocket links of the chain 1. If the rollers 77 are resting on a track of some type it will be readily understood that the entire mold unit, together with its core unit, may be rotated by the rotation of the shaft 72 from the arm 73. This does not cause rotation of the plate 76 and the rollers 77 carried thereby.

In the erect position of the molds the cores are maintained in the mold elements merely by their weight, but when the mold units and cores are inverted it is, of course, necessary to provide some means for preventing the cores from dropping out. This means, in the present case, comprises two circular arms 78, shown well in Fig. 25, these arms being fastened to the plates 76 and therefore not rotating with the mold units. The core bar extension 70 is provided with rollers 79, these being in line with the curved arms 78. When the mold is inverted relative to its guiding rollers 77 the parts assume the position of Fig. 24. Comparing this with Fig. 23 it will be seen that the rollers 77 and the circular arms 78 have not moved, but that the mold units and the cores have been inverted. Thus the rollers 79 at the ends of the core bar extensions 70 move around the circular arms 78 and to the position of Fig. 24 where they are shown as resting on a slightly elevated portion of the inner edge of arms 78.

From Fig. 22 it will be seen that the mold plates 52 and 53 have lateral portions 57$^a$ at their ends, these portions riding between plates 55$^a$ and 56$^a$ which are fast to frame plate 57. The space 56 between plates 55$^a$ and 56$^a$ thus forms a slot slightly wider than the portions 57$^a$ of the mold plates. In the upright position of the molds, as shown in Fig. 22, they rest with all their weight on plates 55$^a$ and when the molds are inverted they are given a slight vertical movement relative to the slot between plates 55$^a$ and 56$^a$ by their weight and thus the molds then rest entirely on plate 55$^a$. This position of the parts is shown in Fig. 24. The elevations of the circular arms 78 are of very slight extent and thus are not high enough to cause the cores to engage the molds in inverted position. Therefore the weight of the molds is not supported by the cores. The width of the slot between the plates 55ª and 56ª permits the molds to rise slightly in their inverted position if a steam pressure sufficient to overcome their weight is formed. In the erect position of the molds their weight is supported entirely by the plate 56ª and the cores are held away from contact with the molds, their weight being supported by the flanges are the cores resting on the mold flanges. It will thus be seen that in both the erect and inverse position of the molds there is possible a slight relative movement between the cores and the molds and that neither of these elements are ever supported directly by the other. The molds never rest on the core bar 69 and the core bar is never supported from the molds.

The inversion of the molds from the position of Fig. 23 to that of Fig. 24 occurs when the mold passes through the reversing mechanism 13 and the mold then remains in the position of Fig. 24 until it reaches the sprocket 2 at the oven end. Passing around this sprocket reverts the mold, but obviously the mold supporting mechanism including the rollers 77 and the plate 78 is then inverted so that the relative position of the molds and the curved plate 78 of Fig. 24 is maintained. Thus the exact position of the mold parts as they move along the lower range of the belt is obtained by inverting Fig. 24 and this relation of parts is continued until the mold units reach the sprockets at the operator's end of the machine.

In order to invert the mold units as they pass along the upper range of belt 1 the reversing mechanism shown generally in Fig. 1 and given reference numeral 13 is employed. The exact construction of this mechanism is shown in Figs. 15 and 16, Fig. 16 being practically an enlargement of some of the parts shown in Fig. 6. The mold supporting rollers 77 ride on tracks 80 and 81 of Fig. 5, these tracks extending between the sprockets 2 and 3 and having the angled shape shown in Fig. 6. Additional tracks 82 and 83 are provided on which the rollers 74 and 75 which are carried on the mold unit shaft 72 ride. When the mold unit leaves the filling position the roller 74 is in advance of roller 75, though after the molds pass the reversing mechanism 13 the opposite is true, namely, that roller 75 is in advance and roller 74 following over the track 82. To cause this inversion of the mold the reversing mechanism 13 comprises two tracks, an upper track 84 in which the roller 74 rides and a lower track 85 in which the roller 75 may move. It will be seen in Fig. 15 that the track 82 has a cut away portion 86 and the roller 74 extends far enough over the track 82 so as not to drop through this cut away portion 86. When it reaches the elevated curved portion 87 of the track 82 it is forced upwardly and just at this time the roller 75 reaches the cut away portion 86 and is therefore forced downwardly through the lower track 85. The upward extension 88 is engaged by the roller 74 and stops the rearward movement thereof while the roller 75 passes completely through the lower track 85. Without further description it will be understood that the mold is inverted as it passes this mechanism and roller 74 follows roller 75 along the left hand portion of the track 82 seen in Fig. 15. Figs. 6 and 16 show the parts when a mold unit has been half inverted or when roller 74 is in its highest position in the extension 88 of the reversing mechanism. The roller 75 is at its lowest position passing through the downwardly curved track 85 and the mold unit and the contained core unit are half inverted. By passing around the sprocket 2 the mold is returned to its upright or erect position, but the short roller 75 remains in advance throughout the movement over the lower range of the belt 1. Thus, when a mold unit reaches a point directly under the sprocket 3 at the operator's end of the machine it is erect but its carrying mechanism is inverted. Clearly, the passing of the carrying mechanism around sprocket 3 will revert it to erect position but a similar movement of the mold unit itself must be prevented and it must be kept in upright position as it passes around the sprocket 3.

To secure this result the mechanism of Fig. 5 is employed, this being an equivalent in function of the reversing mechanism 13 just described. The lower track 83 for the mold inverting rollers divides into two portions again, the inner portion 89 being deeper than the outer portion 90, whereby the roller 74 moves through the curved portion 89 while the roller 75 passes through the portion 90. It will be remembered that on the lower range of the belt the shallow roller 75 is in advance of the deep roller 74 so that the movement of the mold unit by the belt 1 brings the parts to the position of Fig. 5 wherein the arm 73 is horizontal and the mold unit is erect. In order to hold the mold unit rigidly in the position of Fig. 5 so that its contents may be discharged the outer channel or track 90 is provided with a portion 91 constituting an abrupt abutment for the roller 75. A similar stop for the roller 74 is provided by a pin 92ª, the movement of which will be referred to later. It is enough to state at this time that it is in the path of roller 75 and therefore stops it in the position of Fig. 5. After the discharge of the mold unit has occurred this pin 93ª is withdrawn whereby the next movement of the belt 1 may cause the bar 73 temporarily to pivot around the abutment 91 of the outer channel and thus start the roller 74 upward through the inner channel 89. Of course, the inclination of bar 73 thus produced shortly releases the roller 75 from the abutment 91 and the two rollers may then move through the tracks 90 and 89, but it will be observed that the roller 74 reaches the track 82 ahead of the roller 75. Therefore, the position of the molds before described is reached at the time they approach the filling position. It will be seen that the mechanism of Fig. 5 compels the mold to remain erect as it passes around the sprocket 3 but permits the reversion to erect position of the mold carrying devices including the rollers 77, their carrying plate 76 and the curved arms 78. It will be seen from Fig. 25 that the arms 78 end at the left of the figure slightly below the horizontal line from shaft 72. Thus in the position of Fig. 5 the core rollers 79 have passed beyond the arms 78 so that in the position of Fig. 5 the cores may be withdrawn from the molds in order to discharge the mold contents.

The position of the mold in Fig. 5 is its discharging position and at this point a number of separate operations occur mostly in a close sequence, though some of them may occur simultaneously.

It is necessary to lock the mold carriers positively which also places the cutting mechanism, to withdraw the cores, to separate the mold sections, to cause ejecting devices to enter between the mold sections and force the cones out, and then to return the ejector to normal position, close the mold and lower the cores to normal position. The operations at the discharging point occur substantially in the order just given, and they are largely determined by a pivoted arm which is connected to move these various devices to operative positions.

In most cases the parts about to be referred to are duplicated on opposite sides of the machine, but as such parts are precisely alike the duplication need not usually be referred to. Referring to Fig. 2 there is shown a pivoted arm 92 carried on a rod 93 supported in the frame of the machine. At its upper end this pivoted arm has extensions surrounding a slot 94 which is adapted to engage the portion 71 as clearly shown in Figs. 7, 16, 20, 21 and 22 of the mold units and hold it rigidly against movement. To move the pivoted arm 92 around its supporting rod 93 a cam on main shaft 14 is provided with a pitman 95 connected through a lever 96 and a link 97 to the pivoted arm 92. Thus at each rotation of shaft 14 the arm 92 is moved from the position of Fig. 2 to that of Fig. 7 wherein the slot 94 surrounds the portion 71 of the mold. Connected to the arm 92 by a pin and slot connection 98 is an upwardly extending arm 99 loose on a cross shaft 100. There are two of these arms 99 so that they together with the shaft 100 constitute a frame. Carried for movement with the arms 99 are the devices for withdrawing the cores from the molds and the ejectors for forcing the cones out of the molds. The core lifting devices include bars 101 fast to a plate 106 connected to sleeves 102 surrounding bars 103. These bars 103 are carried rigidly on shaft 100 by brackets 103ª and 103ᵇ pinned to the shaft. At their lower ends the bars 101 are provided with extending pins 104, these being positioned to engage in holes 105 in core bars 69, shown in Figs. 3 and 22. The inward movement of the pivoted arm 99 carries these pins 104 into holes 105 and then a vertical movement of the core lifting bars 101 will serve to withdraw the cores from the molds. In order to lift the bars 101 the frame comprising plate 106ª and sleeve 102ª is pivoted to an arm 107. This arm rides in a yoke 108 loose on the shaft 100 and is elevated by an angled frame arm 109 which has a pivotal connection with the bar 107. The frame arm 109 is carried on a vertically moving shaft 110 and surrounding this shaft at its lower portion is an arm 111 (Fig. 4) connected to the shaft 110 by a construction which compels the two to move vertically together, but permits the rotation of shaft 110. To elevate the shaft 110 the arm 111 is connected to a lever 112 which has at its other end a roller 113 riding in a groove in a cam 114 fast on the main shaft 14. Thus at each rotation of shaft 14 the vertical shaft 110 is raised and then lowered. Such elevation of shaft 110 carries upward the connected frame arm 109 and this serves to elevate the rod 107, thus carrying the cores upwardly out of the molds. However, it is desired not only to elevate the cores but to move them out of position above the molds so that the ejecting devices may enter. To this end the movement of the core lifting frame 106 is vertical during the first portion of its travel but then it is given a rotating movement around shaft 100 in addition to the vertical movement of the further portion of its travel. This combined movement is given by a slot 115 in pivoted arm 99. Riding in this slot is a roller 116 fast to a supporting plate of the core lifting devices. Thus the inward movement of bar 99 carries the core lifting bar with it and inserts pins 104 in core bar holes 105. Thus, referring to Fig. 7, the first part of the upward movement of core lifting bars 101 is vertical as the roller 116 is then passing through the first portion of slot 115. That is, the roller 116 moves from the position of Fig. 8 to that of Fig. 7 and during this movement the cores are vertically lifted. However, during the movement of the roller 116 from the position of Fig. 7 to that of Fig. 9 the core lifting bars are swung around the shaft 100 as a center in addition to their further movement of elevation. Thus when the roller 116 has reached the extreme upper portion of slot 115 the cores 68 are not directly over the molds but are some distance to the left thereof. In the position of Fig. 9 the ejectors may be depressed between the sections 52 and 53 of the opened molds. The downward movement of shaft 110 causes, of course, a reversal of the operations just described, that is, the cores are moved downward and forward during a portion of the travel of roller 116 through slot 115 and then are moved vertically into their normal position in the molds.

The cone ejecting devices are also controlled as to forward and rearward movement by the pivoted arm 99. These ejecting devices 117 (Fig. 2) are carried by the vertically extending bars 118$^a$ fast to a cross plate 118$^b$ carried by sleeves 118$^c$ which slide on bars 104$^a$, best shown in Fig. 2. These bars are fast in brackets 103$^a$ which, as before stated, carry the bars 103. Rotation of the bars 103 by the arm 99 will thus rotate the bars 104$^a$ to an equal extent around shaft 100 through the brackets 103$^a$. Thus the bars 103 and 104$^a$ rotate together around shaft 100 and the movement of arm 99 serves to rock them both and thereby to carry the ejectors 117 through part of their inward travel. When the cores are withdrawn from the molds by the upward movement of bar 107 and the mold carrying bars 101 a further rocking of bars 103 is produced by the movement of roller 116 through cam slot 115. This gives an additional rocking movement to the bars 104$^a$ and thus brings the ejectors directly over the molds. They may then be depressed to eject the product.

In order to cause the depression of ejectors 117 the plate 118$^b$ is pivotally connected to a bar 118 which has a pivoted connection with an angled frame bar 121 and this frame bar 121 is connected to a second vertically moving shaft 122 (Fig. 4). An arm 123 is connected to the shaft 122 in a manner such that the shaft and arm must move up and down together, but the shaft may rotate independently of the arm. The arm 123 is connected to an arm 124 of a lever, this arm and the other arm 125 of this lever being connected to a sleeve 126. At the rear end of arm 125 is a roller 127 riding in a groove in a cam 128 also carried by main shaft 14, this being a double faced cam with track 114 on its other face. Thus at each rotation of shaft 14 the vertical shaft 122 is reciprocated first downward and then upward to its normal position. The downward movement of this shaft causes the depression of the ejectors 117 through the medium of angled arm 121 and the carrying rod 118. It will be observed, however, that the ejectors do not go down and up with the roller 116 and therefore they are not given such a combined movement as are the core carriers 101. The inward movement of pivoted arm 92 and the elevation of roller 116 brings these ejectors 117 directly over the molds and then the depression of ejectors 117 just described carries them between the separated mold sections so as to eject the product. The return or upward movement of shaft 122 elevates the ejectors 117 to their normal upper positions and then they move outward to the position of Fig. 2 again.

In order to separate the mold sections, mechanism shown in Figs. 7, 10 and 11 is employed. It will be remembered that to separate the mold sections the plates 60 must be moved from the position of Fig. 29 to that of Fig. 28. In order to cause this elevation two arms 129 are employed carried in brackets 130 and 131 on the pivoted arms 92. Thus these bars 129 are caused to oscillate with pivoted arms 92 but may have a vertical movement independent thereof. In order to give this vertical movement a toggle mechanism shown in Figs. 2, 3, 7, 10 and 11 is employed. This mechanism is generally similar to devices shown in a prior pending application, Ser. No. 705,584, filed June 24, 1912, now Patent No. 1,375,609, issued April 19, 1921, of the present applicants. The toggle comprises arms 132 and 134, the arm 132 being pivoted to the arm 92 by a pin 133, while the other arm 134 of the toggle ends at its lower end in a yoke 135, best shown in Fig. 3 and by which the lower end of arm 134 is connected to a cross shaft 136. This shaft 136 rocks in the vertically movable arms 129, it being provided with pins passing into these arms. Fast to the shaft 136 is a crank arm 137 pivoted to a pitman 138. This pitman is slidably carried by a bar 261 riding in a guide 262 journaled on the shaft 14. The pitman 138 has fast thereto a cam 139 and a spring cam 140. Arms 141 and 142 carried by the shaft 14 are provided with rollers 143 and 144 positioned to engage and operate the cams 139 and 140.

It will be seen that the bars 129 are adapted to float relative to the arm 92, they being slidably carried and contained in position by the members 130 and 131 secured to bars 92, and the relative movement between these two arms is controlled by the toggle just described. Also shaft 136 is a floating shaft, its bodily movement being controlled by the toggle mechanism and this shaft 136 evidently moves up and down with the bars 129. The function of the yoke 135 is to provide a connection between the toggle 134 and the shaft 136 around the lower ends of the bars 129.

The parts are shown in normal position in Fig. 10 and from this figure it will be clear that the rotation of shaft 14 serves to move the pitman 138 to the right or in other words to the position of Fig. 11, thus rocking the link 137 and shaft 136. This rocking breaks the toggle 132—134 and as the upper end of the arm 132 is prevented from upward movement the lower arm 134 must cause an elevation of the bars 129. The pitman 138 therefore has both a movement to the right in Fig. 10 and a movement upwardly, these combined movements resulting in the position of Fig. 11.

These parts are shown in normal position in Fig. 10. When roller 143 engages cam 139 the pitman 138 is moved to the right and is also rocked upwardly, the latter movement being caused by breaking the toggle comprising arms 132 and 134. The upper end of arm 132 is prevented from moving upwardly and so the lower toggle arm 134 moves upwardly and carries bars 129 upwardly, thus elevating the mold unit plates 60 and thus separating the mold sections.

If only roller 143 were provided the pitman 138 would return too soon, but roller 144 engages cam 139 and prevents this. Roller 143 engages spring 140 just as roller 144 leaves cam 139 and returns the pitman 138 to the position of Fig. 10, thus straightening the toggle and closing the mold sections.

It will be seen that this operation of separating the mold sections and bringing them together again occurs while the pivoted arm 92 is in its inner position, as shown in Fig. 7, and thus the separation of the mold sections is properly timed with relation to the withdrawal of the cores and the moving downward of the ejectors 117. The actual sequence of the operations is that the core lifting bars 101 begin their lifting movement first so as to withdraw the cores entirely from the molds and then the downward movement of ejectors 117 may begin. During the latter part of this downward movement the mold sections are opened, whereby the cones are prevented from moving with either of the mold sections as the ejectors 117 are then partly between these mold sections and thus detach the baked cones from the molds.

Figs. 12 and 13 illustrate this operation and in Fig. 12 the baked cone is shown as being still in the mold and the mold sections are fast together. In Fig. 13 the mold sections have been opened and the ejector has forced the cone down out of the mold into the cutting mechanism to be later referred to. Fig. 13 shows the ejectors and it will be understood that in Fig. 12 the ejector is entering between the mold sections and that in Fig. 13 it has forced the cone downwardly out of the mold.

In order to cut the superfluous material from the cones the mechanism shown in Figs. 12 to 14 is employed. The base frame of the machine supports rigidly two bars 145 and surrounding these bars are sleeves 146 carrying a cross plate 147 on which the punch members 148 are carried. As shown in Fig. 3 there are six of these punch members, one for each of the mold elements and because of the rigidity of supporting bars 145 these punch members do not have the oscillating movement such as is given to pivoted arm 92. Carried by the bars 129 shown in Fig. 2 are die members 150. Thus these members are given an oscillating movement with arm 92 and have an independent vertical movement, as the mold sections are opened. The oscillation of arm 92 brings these members directly under the mold sections, as shown in Fig. 13, and the return of the pivoted arm 92 to its outer position moves the die members which then contain the cones from the position of Fig. 13 to that of Fig. 14. Here the cones are directly in the path of the punch members 148 and these members are then given a downward movement along the line of bars 145. To this end the connecting plate 147 is fast to vertically moving arms 151, the vertical movement being guided by the sleeves 146. Arms 151 have slots 151ª into which projections 191 of brackets 130 move when the arms 92 are restored to normal position. These projections 191 guide the arms 151 and ensure accurate engagement of the punch members in the die members. Connected to the lower end of bar 151 is a link 152 fast to a lever 153 which is pivoted on a pin 154 and its other end is provided with a roller engaging a cam 155 on the main shaft 14. Thus at each rotation of shaft 14 the punch members 148 are moved from the position of Fig. 12 downwardly and then restored to their upper positions. This movement is timed to occur after the pivoted arm 92 has moved outwardly and thus the punch members 148 pass inside the die members 150 and cut off the superfluous portions of the cone material. The finished cones may then drop through a chute 156 which moves with the die members 150 and from this chute the cones pass by gravity to a conveyor belt 157 by which they are carried out of the machine and may then be packed by hand. The refuse material thus cut off drops by its own gravity into a second chute 158 and is thereby carried out of the machine into any desired receptacle. Carried by the bars 145 is a stripping brush 159 so positioned as to surround closely the punch members 148. Thus in the upward return movement of punch members 148 they pass closely adjacent this brush and thereby the refuse material is positively stripped off of the punch members and may pass out through the chute 158. As shown in Fig. 3 the brush 159 has scallops which closely surround the punch members 148.

Thus it will be seen that the operation of discharging the cones from the molds is entirely automatic and the timing of the particular parts is largely controlled by the pivoted arm 92. This arm determines the movement of the core lifting, the mold opening and the ejecting mechanisms and causes the cones after they are ejected to be properly carried to a position where the refuse may be cut off. The timing of the operations will be obvious from the preceding description, but it may be stated that the ejectors 117 are moved upwardly, the mold sections closed and the cores 68 returned before the pivoted arm 92 starts its return movement. The actual operation of the punches 148 takes place as the belt 1 is moving.

From the discharging position of the molds at the position of Fig. 5 the mold units are moved to the batter filling position. Referring to Fig. 2 this movement is given in two steps merely for convenience. That is, one rotation of cam shaft 14 through the pawl operating mechanism shown in Fig. 17 serves to move the mold from discharging position to the position shown in Fig. 2 directly over the shaft 26 for sprocket 3. This is an idle position of the mold and all parts of the mold are in normal relation except that the core unit may be slightly lifted out of the mold. It will be understood that in order to fill the molds readily with batter it is advantageous to withdraw the cores partly therefrom. To this end cam tracks 160 are employed, the front of these tracks appearing in Fig. 3 and the tracks as a whole being shown in Fig. 2. These tracks on opposite sides of the mold unit are positioned to be engaged by the core rollers 79 whereby the movement of the molds from a position directly over shaft 26 to the position under the batter filling devices serves to cause these rollers 79 to move up the tracks 160 and thereby partly lift the cores out of the molds. Of course, the elevation is not sufficient to detach the core bar from the perpendicular groove in the frame plate 57, thus preventing horizontal movement of the cores.

It will be seen from Figs. 1 and 2 that the upper track 82 on which the rollers 74 and 75 ride has a depressed portion directly under the batter filling devices. Also, an additional guiding member 161 is provided and thus the track 82 and the guiding member 161 control the movement of rollers 74 and 75. As the mold advances from the idle position over shaft 26 to the filling position the roller 74 to 75 first reaches the depressed portion of track 82 and is guided through this depressed portion. The mold stops in the position of Fig. 2 wherein roller 74 to 75 is in the depressed portion of track 82 while roller 75 is still in the elevated portion thereof. Thus the mold is inclined to the left and as the core is held elevated by the track 160, it is swung to the left by the slots 70l. Thus its center is to the left of the center of the mold and it hangs in a vertical position, thereby leaving a considerable space to the right of the core, into which the batter is poured.

The next movement of the belt 1 carries the mold from its filling position under the nozzles 12 along the track 82 and during this step of movement the core rollers 79 ride down the left hand portion of tracks 160 and are again centrally placed within the molds. In this part of the operation the cores simply rest by their own weight in the molds and this relation continues until the reversing mechanism 13 is reached.

In this movement the mold is oscillated somewhat, as roller 74 reaches the normal elevation of track 82 and roller 75 enters the depressed portion. This brings the core nearer the right side of the mold in Fig. 2 and thus as the core roller rides down the inclined portion of track 160, the core wipes down the right side of the mold and forces the batter up along the left side, thus distributing the batter more evenly in the mold. When the rollers 74 and 75 reach the normal elevation of track 82, the core roller 79 has ridden off of the track 160 and the ordinary relation of the parts is then regained.

Referring to Fig. 5 it will be remembered that pin $92^a$ was stated to lock temporarily the roller 74 against movement. In order to withdraw this pin advantage is taken of the movement of the arm 92. As seen in Fig. 5 the arm 92 has fast thereto a plate $92^b$ having fast thereon a bevel cam device 162. Riding in the open central portion of this device 162 is a roller 163 carried on a lever 164 shown at the left of Fig. 3. This lever is centrally pivoted on a pin 165 and at its upper end is connected to the pin $92^a$.

A pin $92^c$ carried by plate $92^b$ supports a switch pawl $92^d$ positioned inside the central opening of cam 162. A spring $92^e$ serves to maintain switch pawl $92^d$ in the position of Fig. 2 wherein its ends abut the sides of the cam 162.

In Fig. 5 the pin $92^a$ is in the path of roller 74 and thus stops this roller in the discharging position. When arm 92 is rocked to the position of Fig. 7, the roller 163 is engaged by switch pawl $92^d$ and thus rocks lever 164 clockwise in Fig. 3, thereby withdrawing pin $92^a$ from the path of roller 74. However, at this time the slot 94 in arm 92 engages mold shaft 72 and locks the mold. During the latter part of the rearward movement of arm 92 the roller 163 wipes past the end of switch pawl $92^d$, rocking it on its pivot pin $92^c$ and spring $92^e$ promptly returns pawl $92^d$ to its normal position as lever 92 returns to its normal position. The roller 163 is forced to follow the abutting edge of switch pawl $92^d$, being guided by a projection 92ᶠ on cam 162, and thus restores pin 92ᵃ to locking position. The timing of the parts is such that the mold units are moved before pin 92ᵃ is returned to locking position, and thus the return of arm 92 serves to project pin 92ᵃ into the path of the roller 74 of the next following mold unit. The switch pawl 92ᵈ serves to provide a quick movement of pin 92ᵃ in both directions.

The batter filling mechanism is substantially the same as that shown in Patent No. 1,147,974, to Roberts and Roberts, and therefore need not be particularly described. It comprises the tank 11 from which the batter moves to a controlling valve device 166 and from this device tubes 167 lead to the batter nozzles 12. These nozzles are provided, as shown in said prior patent just referred to, with plungers which force the batter from these nozzles into the molds. Also from that patent it will be seen that the nozzles are mounted so as to have bodily pivoted movement whereby to move them adjacent the openings of the molds and to return them therefrom so as to permit movement of the mold units. The various parts of the batter filling mechanism are operated by levers, as shown in Fig. 2, which are controlled by cams on the main cam shaft 14.

The machine as a whole may be started and stopped by operating the clutch 45, as shown on Fig. 4, but in case a machine is to be put in operation or to be stopped it is desirable to be able to prevent operation of the batter filling devices while permitting the rest of the machine to operate. If the machine is to be started it is desirable to preheat the molds by operating the mold forwarding devices and in case the machine is to be stopped it is desirable to complete the baking of the batter which is in the molds being traversed through the machine. In this second case also it is desirable to prevent operation of the batter filling mechanism.

In order to stop the operation of the filling devices while permitting the remainder of the machine to operate the main cam shaft 14 is provided with a clutch device at a point which will permit disconnection of the batter filling mechanism. In Fig. 4 the cams on main shaft 14 which operate the batter devices are at the right of the figure and there is shown a clutch 168 adapted to disconnect these cams from the shaft 14. To accomplish this result a handle 169 shown on Fig. 3 may be employed, this handle being pivoted on a frame bracket 170 and serving to move one element of the clutch 168 longitudinally along shaft 14 and thus disconnect the batter filling mechanism.

To cut off the gas supply or to increase or diminish it a handle 171 is shown on Fig. 1. This is connected through link 172, bell crank lever 173, link 174, lever 175 and link 176 to any desired valve device 177 in the gas supply line. It will be seen that this handle 171 as well as the handle 169 for controlling the batter filling devices is conveniently positioned at the operator's end of the machine so that all of the controlling levers may be readily grasped by the operator without bodily movement.

Any desired mechanism for moving the conveyor belt 157 may be employed. As shown on Fig. 4, the belt is supported on a shaft 178 fast to which is a sprocket 179 driven by a chain 180 which connects to a sprocket 181 on the main cam shaft 14. Thus the conveyor is continuously driven as long as the machine operates and the finished cones may be removed from the conveyor and put into any desired receptacle by hand.

Fig. 27 shows a device for compelling the mold sections 52 and 53 to be exactly positioned when they are moved together. As shown, the section 52 is provided with pins 301 near its opposite ends and these pins pass into tapered holes 302 in the mold section 53. Thus when the sections 52 and 53 are moved together the pins 301 enter the tapered holes 302 and position the mold sections exactly together.

Throughout the specification the cams which operate many of the parts have been referred to only generally as the timing of cams is an ordinary operation for a skilled draftsman and the description points out the sequence of operation of the various parts. The cams shown in Figs. 7 and 11 are especially designed for the particular operations which they perform. In Fig. 7 the cam operating the pitman 95 is shown. This pitman is slidably mounted on a bar 95ᵃ passing through a bracket 95ᵇ loose on the shaft 14. The pitman carries a cam 95ᶜ and a spring arm 95ᵈ. Fast to the shaft 14 are arms carrying three rollers 95ᵉ, 95ᶠ and 95ᵍ and of these rollers 95ᶠ and 95ᵍ are shown as being mounted on a single arm. Also in Fig. 10 two rollers 143 and 144 are provided and a similar cam 139 and spring 140 are shown. The object of these constructions is to cause a longitudinal movement of the pitmen 95 and 138 and to retain them in their adjusted positions during a considerable portion of the operation. In the cam of Fig. 7 the roller 95ᵍ first engages the cam 95ᶜ at the upper end thereof and thus forces the pitman 95 to the right. However, when the roller 95ᵍ reached a position nearly under the shaft 14 it would be unable to retain the pitman 95 in the moved position and to cause such further retention is the function of the other rollers. Thus before roller 95ᵍ leaves cam 95ᶜ the roller 95ᵉ has engaged with the cam and thus maintains it in its position at the right. When the proper time for returning the pitman 95 has been reached the center roller 95$^f$ engages the spring 95$^d$ and quickly restores the pitman 95. The rollers 95$^e$ and 95$^g$ thus are positioned to engage the cam 95$^e$ while the central roller 95$^f$ is out of line with the other two but is in position to engage the spring 95$^d$.

A similar statement might have been made with relation to the cams of Fig. 10 except that in this case rollers 143 and 144 are in the same plane and it is the forward roller 143 which engages the spring 140.

In order to be certain that the pins 104 may engage the core bars 69 properly at the discharging position the parts shown on Figs. 1, 2, 3, 8 and 9 may be employed. Pivotally mounted on the plates 101 carrying the pins 104 are camming arms 272, these being moved by tension springs 271 connected to the cross plate. At their outer ends the arms 272 have slots engaging projections 272$^a$ on the levers 99. Thus in the normal position of the parts, as shown in Fig. 3, the arms 272 rest on the projections 272$^a$. When the lever 99 is moved to its inner position the pins 104 pass into the holes in the core bar 69 and then when the cores are elevated to withdraw them from the molds the arms 272 may rock around their pivot connections with plates 101 so that the outer ends thereof engage cam edges 281 of the core bars, these edges being shown in Figs. 23, 24, 25 and 29 and thus maintain the bars fast on the pins 104. When the cores are again lowered into the molds the opposite operation occurs as the ends of the cam arms 272 engage projections 272$^a$ and thus are rocked away from the edges 281 of the core bar so as to permit their release from pins 104.

The construction of the machine is such that when the molds are in their erect position the cores rest directly upon them and are maintained there by their weight. Also in inverted position the molds rest directly upon the cores and are maintained in that position merely by their weight. This construction permits escape of the steam generated by the baking of the product and such escape is very desirable. It will be understood that the batter is quite moist when injected into the molds and thus the escape of steam at first is quite rapid. In fact in practice it is found that the steam pressure frequently raises the cores slightly out of the molds enough so that the steam may escape. By the time the mold has reached the inverting mechanism 13 and has been inverted thereby a large proportion of the moisture has been driven off but even in inverted position the pressure of the steam if it occurs may readily lift the molds slightly enough to escape as before. Thus the complete baking of the product is obtained and the quality of the product thereby improved.

Having thus fully described our invention, what we claim as new and desire to secure by Letters Patent, is:—

1. In a pastry making machine, the combination, with a mold, and a core therefor, of an ejector for the molded product, means for withdrawing said core from said mold, and a lever having connections to position said core withdrawing means and said ejector simultaneously.

2. In a pastry making machine, the combination, with a mold and a core therefor, of an ejector for the molded product, a frame constructed to withdraw said core from said mold, and a lever, having connections to move said frame to engage said core, and by the same movement to carry said ejector toward ejecting position.

3. In a pastry making machine, the combination, with a mold and a core therefor, of an ejector for the molded product, means for withdrawing said core from said mold, a lever for moving said withdrawing means and said ejector, said lever having a slot in which an element of said withdrawing means rides, means for actuating said core withdrawing means, and connections whereby movement of said element in said slot serves to position said ejector relatively to said mold.

4. In a pastry making machine, the combination, with a mold having separable sections, of means for separating said sections, an ejector for the molded product, and means for moving said ejector between the mold sections as the same are separated whereby to force the molded product positively out of the mold.

5. In a pastry making machine, the combination, with a sectional mold, and a core therefor, of means for moving said core into and out of said mold, mechanism for separating said mold sections, and a device positively moved to a position between said mold sections as the same are separated, the device when so moved engaging the molded product and forcing it out of the mold.

6. In a pastry making machine, the combination, with a mold having separable sections, and means for separating the sections, of ejectors shaped substantially like the molded product, means for moving said ejectors between the mold sections as the same are separated whereby to engage the molded product and force it positively out of the mold, and devices for receiving the molded product.

7. In a pastry making machine, the combination, with a mold having separable conical sections, and means of separating said sections along the altitude thereof, of conical ejectors shaped substantially like the mold sections, and means for moving said ejectors between said mold sections as the same are separated whereby the conical ejectors engage substantially the entire molded product and force it positively out of the mold.

8. In a pastry making machine, the combination, with a mold having separable sections, and means for separating said sections, of ejectors carried above said molds, means for moving said ejectors over said mold, and devices for moving said ejectors downward and between said mold sections as the same are separated, the ejectors then engaging the molded product and positively forcing it downward out of the mold.

9. In a pastry making machine, the combination, with a mold having separable sections and means for separating said sections, of an ejector, a pivoted frame carrying said ejector, means for rocking said frame to bring said ejector over said mold, and means for depressing said ejector in said frame, the depression carrying the ejector between the mold sections as the same are separated and positively forcing the molded product out of the mold.

10. In a pastry making machine, the combination, with a mold having separable sections, and means for separating said sections, of an ejector, a frame carrying said ejector, an arm constructed to move said frame whereby to bring said ejector adjacent said mold, connections from said lever to prevent bodily movement of said mold, and means for depressing said ejector in said frame, this depression carrying the ejector between said mold sections as the same are separated, and positively forcing the molded product out of the mold.

11. In a pastry making machine, the combination, with a mold having separable sections, and means for separating said sections, of a core for shaping the product in said mold, an ejector, a frame carrying said ejector, means mounted on said frame for withdrawing said core from said mold, means for depressing the ejector in said frame after the core has been withdrawn and as the mold sections are separated, the depression of the ejector engaging it with the molded product and forcing it positively out of the mold.

12. In a pastry making machine, the combination, with a mold and a core therefor, of means for withdrawing said core from said mold, said means comprising a frame, means for rocking said frame to engage said withdrawing means with said cores, means for moving said frame to withdraw said cores, said means including a roller, and an arm having a slot with straight and angled portions in which said roller rides in different directions.

13. In a pastry making machine, the combination, with a mold and a core therefor, of a pivoted frame, core withdrawing means mounted in said frame, devices for rocking said frame whereby to engage said withdrawing means with the core, a roller mounted on said withdrawing means, an arm in said frame having a slot with straight and angled portions in which said roller rides, and means for moving said withdrawing means in said frame, thus moving said roller through both portions of said slot.

14. In a pastry making machine, the combination, with a mold and a core therefor, a pivoted frame, including an arm having a slot with straight and angled portions, core withdrawing means carried by said frame and having a roller positioned to ride in both portions of said slot, means for rocking said frame and thereby engaging said withdrawing means with said core, and an angled arm constructed to move said withdrawing means in said frame, thus carrying said roller through both portions of said slot.

15. In a pastry making machine, the combination, with a series of molds and a belt carrying said molds, a sprocket at one end of said belt, having a horizontal axis, and around which said belt moves, means for moving said belt in steps, each step positioning a mold in the line of the horizontal diameter of said sprocket, and discharging mechanism positioned to operate on the mold so positioned, said mechanism including core withdrawing devices and ejectors above said mold, and cutting and delivering mechanism below said mold.

16. In a pastry making machine, the combination, with a belt and a sprocket on a horizontal axis at one end of said belt, of a series of molds carried by said belt, each comprising separable sections and a core therefor, means for moving said belt in steps, each step positioning a mold in the line of the horizontal diameter of said sprocket, and discharging mechanism positioned to act on the mold so positioned, said mechanism including means for withdrawing said core, and an ejector for the molded product, both above said mold, and also including devices for separating said mold sections and for cutting off the molded product, both below said positioned mold.

17. In a pastry making machine, the combination, with a belt and a sprocket having a horizontal axis and around which said belt moves, of a series of molds carried by said belt, each having a core, means for moving said belt in steps, each step positioning a mold or core in the line of the horizontal diameter of said sprocket, means for locking said mold when so positioned, and discharging mechanism, positioned to act on said locked mold, said mechanism, including core withdrawing means and an ejector above said mold and also including cutting mechanism and delivering devices below said mold.

18. In a pastry making machine, the combination, with a mold having separable sections and a core therefor, of a pivoted frame, core withdrawing means and an ejector mounted to be rocked with said frame, means for elevating said withdrawing means in said frame, connections whereby elevation of said withdrawing means positions said ejector above said mold, devices for separating said mold sections, and means for depressing said ejectors between said mold sections as the same are separated, said ejector then engaging the mold product and forcing it positively out of the mold.

19. In a pastry making machine, the combination, with a belt and a sprocket on a horizontal axis at one end of said belt, of a series of molds mounted on said belt, each comprising separable sections, a core for each mold, means for moving said belt in steps, each step positioning a mold and core in the line of the horizontal diameter of said sprocket, core withdrawing means and ejectors positioned above said positioned mold, devices for separating said mold sections and for cutting the molded product positioned below said positioned mold, and a controlling element having connections to move said withdrawing means, said ejectors, said separating and said cutting devices to operative position relative to the positioned mold.

20. In a pastry making machine, the combination, with a mold having separable sections and means for bodily moving said mold to a discharging position, of a controlling element adjacent said discharging position, and means for separating said mold sections and for cutting the molded product, with connections whereby said controlling element moves both said separating and said cutting means to operative position.

21. In a pastry making machine, the combination, with a mold having separable sections, and means for moving said mold bodily to a discharging position, of a pivoted arm, means for separating said mold sections and for cutting the molded product, both mounted on said pivoted arm, and means for rocking said arm to bring said separating and said cutting means to operative position.

22. In a pastry making machine, the combination, with a mold having separable sections, and means for moving said mold bodily to a discharging position, of an element constructed to separate said mold sections, a cutting member carried rigidly on said element, and means for moving said element adjacent the mold in its discharging position and for then operating the member to cause separation of said mold sections.

23. In a pastry making machine, the combination, with a mold and a belt to which said mold is pivoted, of a track for tilting said mold, batter filling devices adjacent said track, and means for moving said belt constructed to stop said mold in batter filling position, said mold being tilted by said track in said filling position.

24. In a pastry making machine, the combination, with a mold and a core therefor, of a belt to which said mold is pivoted, batter filling mechanism, means for moving said belt to bring said mold under said filling mechanism, a track adjacent said filling mechanism, constructed to tilt said mold, and means for partially withdrawing the core from said mold at said filling position.

25. In a pastry making machine, the combination, with a mold and a core therefor, of a belt for moving said mold and to which said mold is pivoted, a mold carrying element having a slot in which a core element moves, batter filling mechanism adjacent said belt, a track constructed to tilt said mold as it reaches said filling mechanism, means for moving said core element in said slot as the mold is tilted, said core hanging vertically when the mold is tilted by said track.

26. In a pastry making machine, the combination, with a mold and a core therefor, of a belt for moving said mold and to which said mold is pivoted, a mold carrying element having a slot in which a core element moves, said slot extending in the line of the axis of the mold, batter filling mechanism including nozzles adjacent said belt and mold, means for tilting the mold as it reaches the filling mechanism, the tilting movement carrying the upper end of the mold away from the filling mechanism, and means for moving said core so that said core element moves upward in said slot, the core hanging vertically in the filling position and being away from the batter nozzles.

27. In a pastry making machine, the combination with a mold and a core therefor, of means for bodily moving said belt whereby to traverse said mold and said core, batter filling mechanism adjacent which said mold and core are moved by said belt, means for tilting said mold as it reaches said filling position, and devices for partially withdrawing said core from said mold at the filling position, the core remaining in a vertical position while the mold is tilted.

28. In a pastry making machine, the combination, with a horizontally movable carrier and a mold pivoted thereon, batter filling mechanism under which said mold is moved by said carrier, a horizontal track having a depressed portion, constructed to tilt said mold in opposite directions successively, a core for said mold, with means for partially withdrawing said core when the mold reaches the filling position, said core hanging vertically when so withdrawn irrespective of the tilting of the mold.

29. In a pastry making machine, the combination, with a mold and a core therefor, of a horizontally movable carrier to which said mold is pivoted, batter filling mechanism under which said mold is moved by said carrier, means for tilting said mold in opposite directions successively as it passes the filling position, and a track engaged by a core element and partially withdrawing said core from said mold at the filling position, said core hanging vertically from said track irrespective of the tilting of the mold.

30. In a pastry making machine, the combination, with a horizontally movable carrier, a mold pivotally mounted thereon, and reversing rollers carried by one end of said mold, of a track on which said rollers ride, said track having one portion elevated and one portion depressed from the normal elevation of said track, the rollers respectively riding in the elevated and depressed portions of the track whereby to invert said mold.

31. In a pastry making machine, the combination, with a horizontally movable carrier, and a mold pivotally mounted on said carrier, of a track adjacent said carrier, said track having one portion elevated and one portion depressed from the normal elevation of said track, and devices fast to said mold and constructed respectively to move through the elevated and the depressed portion of said track whereby to invert said mold.

32. In a pastry making machine, the combination, with a carrier and a mold pivotally mounted thereon, means for moving said carrier to traverse said mold, a track generally parallel to said carrier and having a portion curved from said parallel direction, a wall of said curved portion acting as a stop, and a device rigidly carried by said mold and positioned to pass along said track and through the curved portion thereof, the mold being inverted by engagement of said device with said stop.

33. In a pastry making machine, the combination, with a sprocket, a belt carried by said sprocket, and a mold pivotally mounted on said belt, with means for moving said belt around said sprocket, of tracks adjacent said sprocket, said tracks coinciding above and below the center of said sprocket and being separated between said coinciding portions, and devices carried by said mold constructed respectively to pass through said separated track portions and thereby prevent inversion of said mold.

34. In a pastry making machine, the combination, with a wheel, a carrier movable vertically around said wheel, and a mold pivotally mounted on said carrier, of rollers fast to said mold, tracks adjacent said wheel having portions coinciding above and below the center of said wheel, and having separated portions joining said coinciding portions, said rollers passing respectively through said separated track portions and thereby preventing inversion of the mold, and a pin, with means for projecting said pin into one of said separated track portions and thereby stop the mold roller passing through that portion.

35. In a pastry making machine, the combination, with a wheel, a carrier movable around said wheel, a mold pivotally mounted on said carrier, and deep and shallow rollers fast to said mold, of tracks coinciding above and below the center of said wheel, at a distance from said center substantially equal to the radius of said wheel, said tracks having separated portions joining said coinciding track portions, one of said separated portions passing to a greater distance from said wheel center than the wheel radius, and the other passing at a less distance from the wheel center than the wheel radius, the construction being such that the rollers respectively pass through said separated track portions and thereby prevent inversion of the mold.

36. In a pastry making machine, the combination, with a mold and a core having a flange constructed to rest on said mold when the mold and core are erect, means for inverting said mold and core, and means for mounting said mold, constructed so that the mold may rest on said core by engagement of said mold with said core flange when the mold and core are inverted.

37. In a pastry making machine, the combination, with a mold, and a core having a flange constructed to rest on said mold by engagement of the mold and the core flange when the mold and core are erect, of a frame supporting said mold, and means for inverting said frame, the connection between said mold and its supporting frame permitting the mold to rest on the core, by engagement of the mold with the core flange, when said inverting means has operated.

38. In a pastry making machine, the combination, with a mold and a core having a flange on its upper surface constructed to rest on said mold when the mold and core are erect, of a frame supporting said mold, and having a slot in which a mold element rides, the slot being slightly wider than the mold element, a core bar fast to said core and held away from said frame by engagement of said mold with said core flange, means for inverting said frame and an element positioned to support said core bar when the frame is inverted, the slot in said frame permitting the mold then to rest on the core by engagement of said mold with the core flange.

39. In a pastry making machine, the combination, with a mold and a core therefor, of a core bar supporting said core, a roller on said core bar, means for inverting said mold, said core and said core bar, and a curved guide inside which said core roller rides when the same is inverted and acting to sustain said core bar and said core in their inverted position.

40. In a pastry making machine, the combination, with a mold, a core therefor, and a core bar for supporting said core, of a carrier for said mold and core, means for inverting said mold and said core relative to said carrier, and a curved arm fast to said carrier and inside which an element of said core bar rides when the mold and core are inverted, the curved arm acting to sustain the core bar and core in the inverted position.

41. In a pastry making machine, the combination, with a mold and a core therefor, said core normally resting on said mold, of a carrier for said mold, means to invert said mold and said core relative to said carrier, and an element fast to said carrier and constructed to support said core in its inverted position.

42. In a pastry making machine, the combination, with a movable carrier, and molds mounted on said carrier, of means for moving said carrier in steps, each step bringing a mold to a discharging position, a pivoted arm, an ejector for the molded product controlled by said arm, a die mechanism controlled by said arm and into which the product is moved by said ejector, a punch, and means for carrying said punch into said die, said means operating during the stepped movement of said carrier.

43. In a pastry making machine, the combination, with a movable carrier, of a mold and a core therefor, devices supporting said mold and said core, and connections whereby said devices are rotatably mounted on said carrier, thereby permitting inversion of said mold and said core.

44. In a pastry making machine, the combination, with a movable carrier, of a mold and a core therefor, devices independently supporting each end of said mold and said core, and connections whereby said devices are independently rotatably mounted on said carrier, thereby permitting inversion of said mold and said core.

45. In a pastry making machine, the combination, with a movable carrier, of a sectional mold and a core therefor insertable between the mold sections, a frame supporting said mold sections, and connections whereby said frame is rotatably mounted on said carrier, thereby permitting inversion of said mold and said core.

46. In a pastry making machine, the combination, with a movable carrier, of a sectional mold and a core therefor insertable between the mold sections, devices supporting said mold sections and constructed to permit movement of said sections relative to each other, whereby to open the mold, and connections whereby said supporting devices are rotatably mounted on said carrier, thus permitting inversion of said mold.

47. In a pastry making machine, the combination, with a movable carrier and a mold mounted thereon, of a driving shaft for said carrier, a ratchet carried by said shaft, a pawl, an arm carrying said pawl, a plate for controlling engagement of said pawl with said ratchet, and means for oscillating said pawl carrying arm.

48. In a pastry making machine, the combination, with a movable carrier, and a mold mounted thereon, of a driving shaft for said carrier, a ratchet carried by said shaft, a pawl, and an arm carrying said pawl, a second arm having a slot with a circular and a radial portion, in which slot an element of said pawl rides, a plate controlling the movement of said pawl into and out of engagement with said ratchet by contact of said pawl element with the radial portion of said slot, and means for oscillating said slotted arm.

49. In a machine of the class described, a plurality of sets of separable mold sections having semi-mold cavities, those of one section adapted to register with those of the opposing section, cores therefor, means for sustaining the mold sections to be opened and closed by relative movement of the same bodily laterally while maintaining their opposing faces in planes parallel to the axes of the mold cavities as a whole, means for introducing and removing the cores from the mold cavities, a set of dummy cores, means for introducing said dummy cores into the cavities of the baked article after removal of the mold cores, and means for relatively moving the mold sections and the dummy cores whereby the baked articles are loosened from the mold sections, said articles being adapted to pass through between the mold sections when the sections are separated.

In testimony whereof, we affix our signatures.

WEBSTER M. ROBERTS.
PARK D. ROBERTS.